US011327815B1

(12) United States Patent
Koponen et al.

(10) Patent No.: US 11,327,815 B1
(45) Date of Patent: *May 10, 2022

(54) VALIDATING POLICIES AND DATA IN API AUTHORIZATION SYSTEM

(71) Applicant: Styra, Inc., Redwood City, CA (US)

(72) Inventors: Teemu Koponen, San Francisco, CA (US); Timothy L. Hinrichs, Los Altos, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,301

(22) Filed: Jul. 15, 2020

Related U.S. Application Data

(63) Continuation of application No. 16/293,509, filed on Mar. 5, 2019, now Pat. No. 10,719,373.

(60) Provisional application No. 62/722,018, filed on Aug. 23, 2018.

(51) Int. Cl.
*G06F 9/54* (2006.01)
*H04L 9/32* (2006.01)
*G06F 21/44* (2013.01)

(52) U.S. Cl.
CPC ............... *G06F 9/54* (2013.01); *G06F 21/44* (2013.01); *H04L 9/3236* (2013.01); *H04L 9/3247* (2013.01)

(58) Field of Classification Search
CPC .... H04L 9/3236; H04L 9/3239; H04L 9/3242
See application file for complete search history.

(56) References Cited

U.S. PATENT DOCUMENTS

| 4,309,569 A | * | 1/1982 | Merkle | ................. | H04L 9/3236 340/5.8 |
| 5,974,549 A |   | 10/1999 | Golan |
| 6,460,141 B1 |   | 10/2002 | Olden |
| (Continued) |

OTHER PUBLICATIONS

Non-Published commonly Owned U.S. Appl. No. 16/050,119, filed Jul. 31, 2018, 55 pages, Styra, Inc.

(Continued)

*Primary Examiner* — Brian W Wathen
(74) *Attorney, Agent, or Firm* — Adeli LLP

(57) ABSTRACT

Some embodiments provide a method for distributing a set of parameters associated with policies for authorizing Application Programming Interface (API) calls to an application. For a previously stored hierarchical first document that comprises a first set of elements in a first hierarchical structure, the method receives a hierarchical update second document that comprises a second set of elements in a second hierarchical structure corresponding to the first hierarchical structure, wherein at least a subset of elements in the first and the second documents correspond to the set of parameters for evaluating API calls. The method receives a first set of hash values for elements of the first document that are not specified in the second document, and generates a second set of hash values for a set of elements specified in the second document. The method generates an overall hash for the second document by using the received first set of hash values and the generated second set of hash values. The method uses the overall hash to validate a signature from an entity that is authorized to specify the set of parameters.

20 Claims, 14 Drawing Sheets

(56) References Cited

U.S. PATENT DOCUMENTS

| | | |
|---|---|---|
| 6,985,953 B1 | 1/2006 | Sandhu et al. |
| 7,124,192 B2 | 10/2006 | High, Jr. et al. |
| 7,752,661 B2 | 7/2010 | Hernsath et al. |
| 7,865,931 B1 | 1/2011 | Stone et al. |
| 7,937,755 B1 | 5/2011 | Guruswamy |
| 8,613,070 B1 | 12/2013 | Borzycki et al. |
| 8,683,560 B1 | 3/2014 | Brooker et al. |
| 8,789,138 B2 | 7/2014 | Reierson et al. |
| 8,850,528 B2 | 9/2014 | Biljon et al. |
| 9,106,661 B1 | 8/2015 | Stamos |
| 9,374,417 B1 | 6/2016 | Greenfield et al. |
| 9,397,990 B1 | 7/2016 | Taly et al. |
| 9,420,002 B1 | 8/2016 | McGovern et al. |
| 9,521,032 B1 | 12/2016 | Worsley |
| 9,648,040 B1 | 5/2017 | Morkel et al. |
| 9,948,681 B1 | 4/2018 | Kruse et al. |
| 10,021,103 B2 | 7/2018 | Xu et al. |
| 10,122,757 B1 | 11/2018 | Kruse et al. |
| 10,148,493 B1 | 12/2018 | Ennis, Jr. et al. |
| 10,257,184 B1 | 4/2019 | Mehta et al. |
| 10,263,995 B1 | 4/2019 | Kruse et al. |
| 10,339,303 B2 | 7/2019 | Mehta et al. |
| 10,454,975 B1 | 10/2019 | Mehr |
| 10,592,302 B1 | 3/2020 | Hinrichs et al. |
| 10,719,373 B1 | 7/2020 | Koponen et al. |
| 10,984,133 B1 | 4/2021 | Hinrichs et al. |
| 10,986,131 B1 | 4/2021 | Kruse et al. |
| 10,990,702 B1 | 4/2021 | Hinrichs et al. |
| 11,023,292 B1 | 6/2021 | Hinrichs et al. |
| 11,080,410 B1 | 8/2021 | Sandall et al. |
| 2003/0115484 A1 | 6/2003 | Moriconi et al. |
| 2003/0220925 A1 | 11/2003 | Lior |
| 2005/0081058 A1 | 4/2005 | Chang et al. |
| 2006/0053290 A1 | 3/2006 | Randle et al. |
| 2006/0059569 A1 | 3/2006 | Dasgupta et al. |
| 2007/0006325 A1 | 1/2007 | Gargaro |
| 2007/0156670 A1 | 7/2007 | Lim |
| 2007/0226320 A1 | 9/2007 | Hager et al. |
| 2008/0022357 A1 | 1/2008 | Agarwal et al. |
| 2009/0019533 A1 | 1/2009 | Hazlewood et al. |
| 2009/0055749 A1 | 2/2009 | Chatterjee et al. |
| 2009/0077618 A1 | 3/2009 | Pearce et al. |
| 2009/0138960 A1 | 5/2009 | Felty et al. |
| 2010/0095373 A1 | 4/2010 | Levenshteyn et al. |
| 2010/0333079 A1 | 12/2010 | Sverdlov et al. |
| 2012/0030354 A1 | 2/2012 | Razzaq et al. |
| 2012/0066487 A1 | 3/2012 | Brown et al. |
| 2013/0226970 A1* | 8/2013 | Weber .................. G06F 21/604 707/785 |
| 2013/0227636 A1 | 8/2013 | Bettini et al. |
| 2013/0283370 A1 | 10/2013 | Vipat et al. |
| 2013/0305354 A1 | 11/2013 | King et al. |
| 2014/0032691 A1 | 1/2014 | Barton et al. |
| 2014/0032733 A1 | 1/2014 | Barton et al. |
| 2014/0033267 A1 | 1/2014 | Aciicmez |
| 2014/0181186 A1 | 6/2014 | Stevens et al. |
| 2014/0237594 A1 | 8/2014 | Thakadu et al. |
| 2014/0372986 A1 | 12/2014 | Levin et al. |
| 2015/0089575 A1 | 3/2015 | Vepa et al. |
| 2016/0057027 A1 | 2/2016 | Hinrichs et al. |
| 2016/0057107 A1 | 2/2016 | Call et al. |
| 2016/0103870 A1 | 4/2016 | Patiejunas et al. |
| 2016/0205101 A1 | 7/2016 | Verma et al. |
| 2016/0352695 A1 | 12/2016 | Kozolchyk et al. |
| 2016/0373455 A1 | 12/2016 | Shokhrin et al. |
| 2016/0381032 A1 | 12/2016 | Hashmi et al. |
| 2017/0075938 A1 | 3/2017 | Black et al. |
| 2017/0124166 A1 | 5/2017 | Thomas et al. |
| 2017/0142068 A1 | 5/2017 | Devarajan et al. |
| 2017/0161120 A1 | 6/2017 | Sasaki et al. |
| 2017/0220370 A1 | 8/2017 | Klompje et al. |
| 2017/0237729 A1 | 8/2017 | Uppalapati |
| 2017/0279805 A1 | 9/2017 | Diaz-Cuellar et al. |
| 2017/0331629 A1 | 11/2017 | Kozolchyk et al. |
| 2017/0364702 A1 | 12/2017 | Goldfarb et al. |
| 2018/0062858 A1 | 3/2018 | Xu et al. |
| 2018/0067790 A1 | 3/2018 | Chheda et al. |
| 2018/0109538 A1 | 4/2018 | Kumar et al. |
| 2018/0295036 A1 | 10/2018 | Krishnamurthy et al. |
| 2018/0309746 A1* | 10/2018 | Blasi .................. H04L 9/3239 |
| 2019/0007418 A1 | 1/2019 | Cook et al. |
| 2019/0007443 A1 | 1/2019 | Cook et al. |
| 2019/0020665 A1 | 1/2019 | Surcouf et al. |
| 2020/0007580 A1 | 1/2020 | Liderman et al. |
| 2021/0029029 A1 | 1/2021 | Mehmedagic et al. |
| 2021/0240550 A1 | 8/2021 | Hinrichs et al. |
| 2021/0248017 A1 | 8/2021 | Hinrichs et al. |
| 2021/0365571 A1 | 11/2021 | Sandall et al. |

OTHER PUBLICATIONS

Non-Published commonly Owned U.S. Appl. No. 16/050,123, filed Jul. 31, 2018, 56 pages, Styra, Inc.

Non-Published commonly Owned U.S. Appl. No. 16/050,124, filed Jul. 31, 2018, 56 pages, Styra, Inc.

Non-Published commonly Owned U.S. Appl. No. 16/050,127, filed Jul. 31, 2018, 56 pages, Styra, Inc.

Non-Published commonly Owned U.S. Appl. No. 16/050,136, filed Jul. 31, 2018, 57 pages, Styra, Inc.

Non-Published commonly Owned U.S. Appl. No. 16/050,139, filed Jul. 31, 2018, 56 pages, Styra, Inc.

Non-Published commonly Owned U.S. Appl. No. 16/050,143, filed Jul. 31, 2018, 56 pages, Styra, Inc.

Non-Published commonly Owned U.S. Appl. No. 16/293,503, filed Mar. 5, 2019, 61 pages, Styra, Inc.

Non-Published commonly Owned U.S. Appl. No. 16/293,513, filed Mar. 5, 2019, 63 pages, Styra, Inc.

Preuveneers, Davy, et al., "Access Control with Delegated Authorization Policy Evaluation for Data-Driven Microservice Workflows," Future Internet, Sep. 30, 2017, 21 pages, vol. 9, Multidisciplinary Digital Publishing Institute.

Wei, Hao, et al., "Enhance OpenStack Access Control via Policy Enforcement Based on XACML," In Proceedings of the 16th International Conference on Enterprise Information Systems, Apr. 2014, 7 pages, vol. 1, SciTePress, Lisbon, Portugal.

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Non-Published commonly Owned U.S. Appl. No. 16/834,200, filed Mar. 30, 2020, 58 pages, Styra, Inc.

Non-Published commonly Owned U.S. Appl. No. 17/392,072, filed Aug. 2, 2021, 67 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, IEEE, London, UK.

\* cited by examiner

```
package VM_modification.authz import data.ldap                    902
import data.incident
import data.jira.issues

# Example input
# input = { "user": "alice" }
                                    905
# Allow if user in engineering and not blocked
allow {
    ldap.group["engineering"] [_] = input.user
    not blocked
}
                                    910
# Blocked during incident
blocked {
    incident = "True"
    not temporary_exemption
}

# Grant exception using Jira    915
temporary_exemption {
    issues[i].fields.assignee = input.user
    issues[i].labels[_] = incident.True_label
}
```

*Figure 9*

VALIDATING POLICIES AND DATA IN API AUTHORIZATION SYSTEM

CLAIM OF BENEFIT TO PRIOR APPLICATIONS

This application is a continuation application of U.S. patent application Ser. No. 16/293,509, filed Mar. 5, 2019, now issued as U.S. Pat. No. 10,719,373. U.S. patent application Ser. No. 16/293,509 claims the benefit of U.S. Provisional Patent Application 62/722,018, filed Aug. 23, 2018. U.S. patent application Ser. No. 16/293,509, now issued as U.S. Pat. No. 10,719,373, is incorporated herein by reference.

BACKGROUND

Most applications today use access control rules to allow different users with different privileges, different access to the applications and their resources. Typically, the access controls are coded within an application's code base, which makes it very difficult to modify these controls statically, and impossible to modify them dynamically while the application is running. This problem is especially acute for micro-service applications which are often small, well-defined applications that perform a small set of operations. Incorporating complex access controls in these applications is not practical as such controls would burden these applications with unnecessary functional complexity that not only runs counter to the focus of these micro-service applications, but would also be difficult to maintain and update. Accordingly, most micro-service applications employ no access controls or the most rudimentary access controls.

BRIEF SUMMARY

Some embodiments of the invention provide a system for defining, distributing and enforcing policies for authorizing API (Application Programming Interface) calls to applications executing on one or more sets of associated machines (e.g., virtual machines, containers, computers, etc.) in one or more datacenters. An entity can use this system to control the behavior of the entity's software systems, e.g., cloud machines, on-premise machines, or SaaS machines. The API authorization system in some embodiments provides policy enforcing agents co-located with entity machines (e.g., virtual machines, containers, standalone servers, etc.) along with policy and contextual data storages that store the entity managed policies and contextual data. Alternatively, or conjunctively, the API authorization system includes controllers that configure the entity's policy enforcing agents with the appropriate API processing policies and data.

To provide such services to an entity, the entity has to trust the API authorization system to provide the correct policies and contextual data to the agents involved in the API authorization operations. This is the case even when the entity runs all the data sources locally on-premise (e.g., to import contextual data for his policies from his on-premise systems), runs all controllers on-premise (to manage his system APIs based on policies he uploaded to API-authorization system), and runs policy agents on-premise near on-premise entity application/service machines (e.g., consults on-premise policy agents to policy decisions).

In any of these implementations, the policy and contextual data are exchanged between the API-authorization system's machines and the entity's machines. In such cases, the entity needs to have high confidence in the integrity of the trust chain. The entity needs provable guarantees that nothing alters the policies that the entity wrote, or the contextual data downloaded from the entity's systems, from the moment the entity uploaded them, to the moment they are consumed by agents running on-premises and enforcing them.

To solve this, the API-authorization system uses cryptographic signatures in some embodiments. This approach allows the entity to sign its policies, as well as the contextual data extracted from the entity's systems, before they are uploaded to API-authorization system. When the policies and data are downloaded back by the agents running on-premise, the agents can verify the signatures, and this ensures that no one tampered the data when the signature proves to be valid. Furthermore, since the signing keys are never uploaded to API-authorization system service, only someone at the entity's premises can generate the signatures. As a result, the cryptographic signatures reduce the compromise of API-authorization system only to matter in terms of reduced availability: at most, someone can hack the system to send policies and data with invalid signatures, which are then rejected by the agents, effectively creating denial of service attack.

Some embodiments, however, do more than plain cryptographic signatures. This because API-authorization system filters down the data downloaded in the bundles with the policies in order to reduce the amount of contextual data sent to the controllers and policy agents. In other words, the system does not send the entity provided contextual data as such. It does this by executing static analysis over the policy code, trimming out any data that will not be used by the policies. This comes with a side-effect as this trimming would invalidate ordinary cryptographic signatures protecting the data. In some cases, trimming of the policies is less of an issue and requirement since the policies are smaller. Hence, in some cases, ordinary signatures will work to guarantee the integrity of policies as they are not trimmed.

To allow for the signing of trimmed contextual data, the API-authorization system of some embodiments signs structured documents that contain the contextual data. This solution makes the data signature computation aware of the structure of the document (e.g., JSON document) signed. In the ordinary signature schemes for generic data, the signature is computed for a cryptographic hash that is then computed over the byte stream representing the entire document—as it is presented on wire. Contrary to this, the API-authorization system of some embodiments makes the signatures aware of the structure of the document, by computing the hash using a hash tree.

In some embodiments, the signing process of the API-authorization system, at the data source agent, first computes a hash of a full JSON document representing the most recent JSON data downloaded from the entity system. This hash is computed as a Merkle tree over the hierarchical JSON document, with the JSON document being treated as a hierarchical tree. As a result, a single hash is still produced for the entire document, just like with ordinary hashes which would produce one by computing one over the serialized JSON byte presentation.

The signing process of the API-authorization system then signs the hash with a private signing key, per typical public key cryptographic best practices. The process then stores the resulting signature, together with the corresponding public key (and its certificate), with the document. However, in some embodiments, the signing process of the API-authorization system does not store any hashes nor their intermediates.

The signing process stores the document along with it signature in the storage of the API-authorization system. When it has to send data to the entity agents, the API-authorization system service filters unnecessary data out of the JSON document. The signing process recomputes the Merkle hash tree, using the whole document. The signing process then computes the necessary hashes on the fly per document served (when policy bundles are being downloaded), or computes them once and saves/caches them with the document. If saved, the system reduces the storage cost by using delta-encoding over time in some embodiments. That is, if content remains stable over time, the hashes remain too. When a branch of the JSON document is filtered entirely, the system removes the branch and obtains the hash corresponding the branch from the computed hash tree. No further details of the content cut are included in the trimmed document in some embodiments. The system stores this branch hash to a separate filter tree.

Some embodiments identify unnecessary data with static code analysis that has to guarantee not to change the evaluation result in any condition. It does not have to be optimal reduction, though; the data can still include unused portions. The base case is simple: if the data is not referred in the code, it is not needed. For example, if the code has data references "a.b" and "c.d.e", the JSON document would not need branches "a.c", nor "c.d.f." Furthermore, even when there is a reference to "a.b", and the system knows the value match required, the system can filter down the values within "a.b" even further. For instance, if the policy has a statement "a.b=50", it could imply the value has to be 50 and nothing else is relevant and all other possible values can be removed. However, a branch cannot be filtered effectively if it is used in negation. If the condition is "not 50", then at best we do is filter out the content it if it's 50—everything else has to be included.

On the enforcement side, either at the controller or policy agent running on-premises, the system executes the following steps to verify the signatures for a single data source JSON document. A signature validator recomputes the hash tree. When a branch was trimmed, the signature validator uses the hash of the branch saved during the filtering. The hashes are available in the accompanied filter tree in some embodiments. The filter tree is included in the signature envelope holding the signature, which is stored in the bundle.

In some embodiments, each data source has its own signature envelope, since each data source is signed individually—as they might be coming from different data source agent instances. Accordingly, a single downloaded 'bundle' from API-authorization system service will contain multiple signatures (in fact, many for data sources, and many for policy modules).

The signature validator verifies the signature with the computed hash and public key, available in the attached certificate. The precondition for this is that the certificate is considered trusted, and it will be if that public key has been explicitly listed as trusted (through configuration) or there's a certificate chain from a certificated explicitly listed a trusted. The trust chain establishment process follows standard PKI best practices.

The API-authorization system has the following properties for signing contextual data while allows this data to be filtered. First, there's no extra storage cost beyond one signature and its public key. The computed hash tree does not have to be transferred with the signature. Second, the data signing takes roughly the same time as with standard signatures: it is one public key operation used to sign a computed hash (tree). Third, the verification is the same cost as well, i.e., hashing and one public key operation. Fourth, filtering remains as effective as before with the exception of the negation which may now require preserving the negated content.

For policies, the signatures are handled like ordinary digital signatures: a hash of policy document (source) is computed which is then signed and can be equally verified by recomputing the hash. No trimming for policies is executed so the signatures remain valid.

On the enforcement side, when the policies are loaded from API-authorization system and then verified, the overall process starts from the policy that is to be executed and therefore triggered the downloading. That is, if the evaluation calls for running policy a/b/c, the policy for that name is verified first. Then what follows is static analysis of that policy and then loading and further verification of any referred data and policies. This proceeds recursively until all the policies and data have been loaded and verified.

However, it could be that all the policies and data referred do not exist, or that they are referred in a way it's not clear how many they are. For instance, consider the following scenario. If the data reference is an aggregate, say, a.b, while the individual data sources with signatures are a.b.c and a.b.d, there's no provable way to conclude using only the reference a.b which are the data sources to expect. Therefore, while still not being able to tamper the contents, it is possible for attacker to cause omitting of those data source content from the downloaded bundle. The verifier would have no way separating between the cases of data not originally even existing or attacker removing the data on path. The above applies also to policies.

There are several options how to solve this inability to figure out the existence of data sources and policies. First, the entity can provide a signed, trusted list of data sources/policies in its managed namespace. Then using that signed catalog, it is easy for the verifier to validate whether the entity got all the data sources and policies that should exist. The second option is to include enough metadata in the policies itself (holding these references). They could indicate which are the expected and required data sources and policies—or simply require that anything referred has to exist as such. Then at the verification time the verifier could compare the required and available names.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 9 illustrates an example of the policy opcode and operand that can be used to implement API-authorization controls.

DETAILED DESCRIPTION

Figure 1:
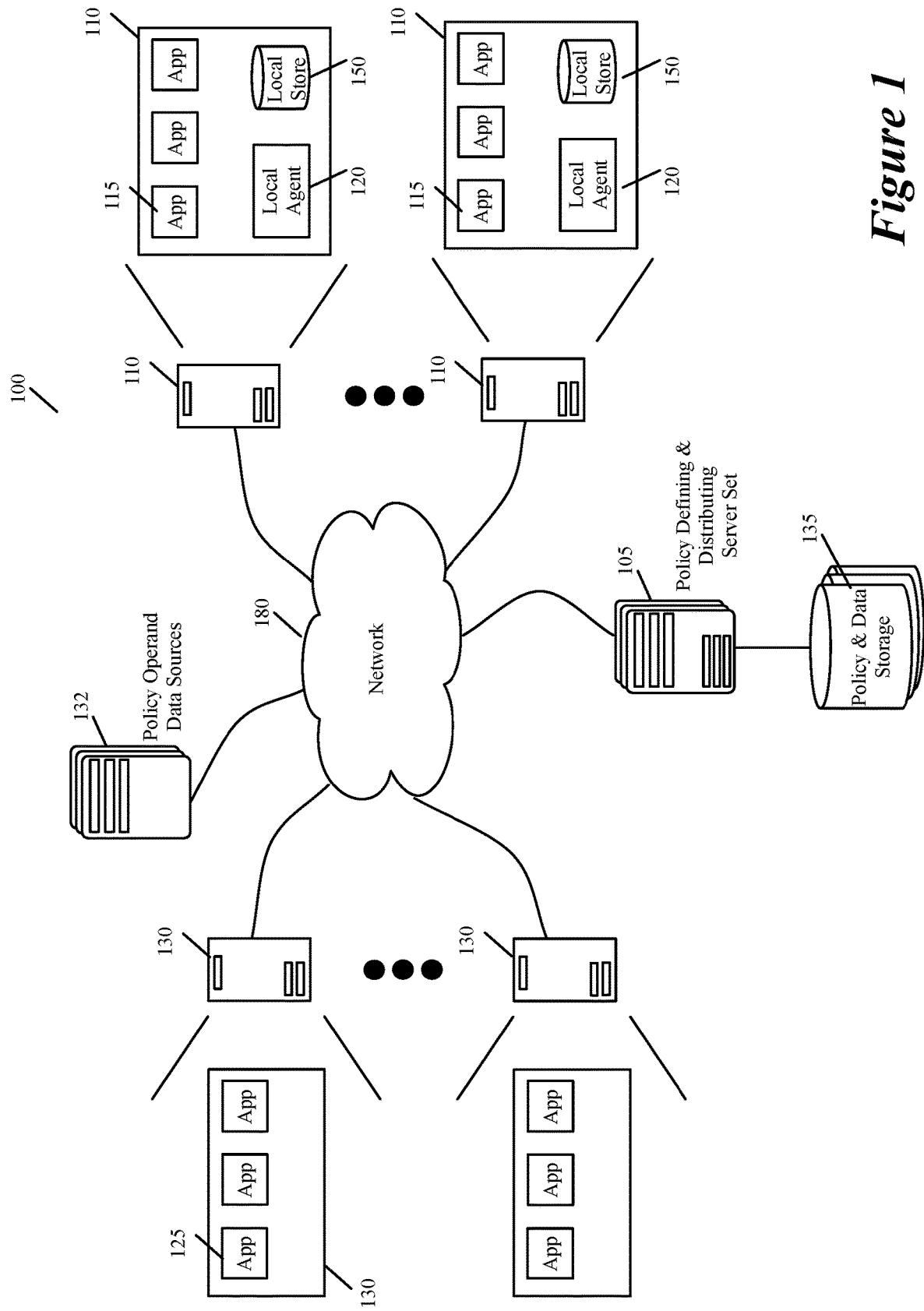
FIG. 1 illustrates a policy enforcement system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for defining, distributing and enforcing policies for authorizing API (Application Programming Interface) calls to applications executing on one or more sets of associated machines (e.g., virtual machines, containers, computers, etc.) in one or more datacenters. This system has a set of one or more servers that acts as a logically centralized resource for defining, storing, and distributing policies and parameters for evaluating these policies.

The server set in some embodiments receives and stores definitions of several authorization policies for several API calls to one or more applications executing on a set of associated machines. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments collects and stores parameters for evaluating the authorization policies to assess whether API calls should be authorized. For one or more sources (e.g., LDAP directories, etc.) in the datacenter(s), the server set in some embodiments has one or more data-source adapters that collect parameters from these data sources and store these parameters in order to evaluate the authorization policies to assess whether API calls should be authorized. The server set also allows such parameters to be entered through a web-based user interface.

The collected parameters in some embodiments are specific to each set of related machines (e.g., for each tenant in a multi-tenant datacenter or each department or division of a multi-department or multi-division entity) for which the server set defines and distributes policies. The server set in some embodiments updates these parameters dynamically in real time. Accordingly, in some embodiments, the server set uses, collects, and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the sever set in each deployment. This is because the server set not only allows custom policies to be defined for each deployment based on the deployment-setting specific parameters, but also allows these policies to be resolved based on dynamically changeable parameters for each specific deployment.

For each set of related machines, the server set in some embodiments stores the defined API-authorization policies, and collected parameters needed to resolve these policies, in a single hierarchical storage structure (such as a namespace) that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

The server set in some embodiments identifies updates to parameters for evaluating the policies and stores these updates in this storage structure along with the authorization policies. In some embodiments, the runtime storage structure (e.g., the namespace) stores the policy for authorizing each API call as one or more lines of opcode (as one or more opcode expressions/statements). Each such policy is referred to as policy opcode in the discussion below. Also, policy operands in the discussion below refer to the parameters that are needed to resolve the policy opcodes for the API calls. The single storage structure stores such policy operands along with the policy opcodes. Policy operands can also accompany the API calls, or the API-authorization requests that are generated in response to such API calls.

In some embodiments, the server set distributes the defined policies and parameters to policy-enforcing local agents that execute near the applications that process the API calls. Different embodiments place the local agents in different positions with respect to their associated applications, as further described below. In some embodiments, the server set distributes different sets of policies and parameters to different local agents based on the policies that are relevant to the API-authorization processing for the applications associated with those agents.

From an associated application, a local agent receives API-authorization requests to determine whether API calls received by the application are authorized. In response to such a request, the local agent uses one or more parameters associated with the API call to identify a policy stored in its local policy storage to evaluate whether the API call should be authorized. To evaluate this policy, the agent might also retrieve one or more parameters from the local policy storage.

The local agent then uses the received or retrieved parameters to evaluate the retrieved API-authorization policy in order to determine whether the API call should be approved or rejected. Based on this evaluation, the local agent then sends a reply to the application that sent the API-authorization request, to specify whether the API call should be approved or rejected. In some embodiments, the applications send the API-authorization requests as RPC (Remote Procedure Call) messages, and the local agents send their replies to these requests as RPC reply messages.

In other embodiments, the authorization module sends its API-authorization requests to the local agent through other mechanisms (such as IPC (inter-process communication) messages) that initiate above the network stack. Also, in some embodiments, the API-authorization request does not come to the local agent from the application to which the API call is directed. For instance, in some embodiments, a first application intercepts an API call intended for a second application, and sends a request (e.g., through RPC, IPC, etc.) to authorize this API call to the local agent. When the local agent authorizes this request, the first application then passes the API call to the second application, while discarding this call when the local agent rejects this call. In some embodiments, the first application not only intercepts API calls to obtain authorization for these calls, but also intercepts these calls to first have them authenticated by a separate authentication service.

In some embodiments, the local agents are used to authorize API calls for both application domain logic (also called core logic or business logic) and application infrastructure logic. In other embodiments, the local agents are used to authorize API calls for application infrastructure logic but not application domain logic. Applications typically include application domain logic and application infrastructure logic. Application domain logic captures the domain rules for creating, storing, and manipulating data relating to the core functions of the application. For instance, in banking, domain logic captures the logic to calculate the monthly interests for bank accounts, prepares and calculates a mortgage offer (involving complex formulas using credit scores and other information available), or simply moves funds between two accounts. In banking, domain logic would also be responsible for preparing the web page contents as customers access their bank accounts over the web.

Application infrastructure logic provides support functions that allow the application domain logic to run, and to run with reliability and scalability. Examples of such support functions include integration functions with other applications (various protocol implementations), configuration management (logic might have configuration options), monitor and alert functions (to detect when the domain logic is down), schedule and thread management facilities (to run several logic instances in parallel for improved scalability), etc. While these functions are critical, they are not typically a concern of the application domain logic. Hence, decoupling API authorization for infrastructure logic simplifies the application code and allows the application's code to focus on the matters relevant to the application's core functions.

FIG. 1 illustrates a policy enforcement system 100 of some embodiments of the invention. As shown, this system includes a server set 105, several host computers 110, a first set of applications 115 executing on the host computers 110, several local agents 120 executing on the host computers, and a second set of applications 125 executing on the same host computers 110 or other devices or computers 130. The various computers and devices of the system 100 communicatively connect to each other through a network 180, which can include one or more local area networks, wide area networks, wireless networks, a network of networks (e.g., Internet), etc.

The host computers 110 in some embodiments operate in one or more datacenters. In some embodiments, the server set 105 includes one or more servers that operate in the same datacenter as the host computers 110, while in other embodiments the server set operates in a different datacenter than one or more of the host computers. The server set 105 acts as a logically centralized resource for defining, storing, distributing and enforcing policies for authorizing API calls to the first set of applications 115 that execute sets of associated machines (e.g., VMs, containers, etc.) that execute on the host computers 110. In some embodiments, each set of associated machines is associated with one entity (e.g., belongs to a tenant in a multi-tenant datacenter or to one division of a corporation in a corporate datacenter). Accordingly, the server set can be used to define, store, distribute and enforce different sets of policies for authorizing API-calls for the set of applications 115 that belong to different entities in one or more datacenters.

In some embodiments, some of these applications execute on virtual machines (VMs) or containers on the host computers, while other applications execute over the operating systems of the host computers. Also, in some embodiments, some of the API calls to a set of associated applications 115 come from other applications in the same set, while other API calls to the application set come from other applications (e.g., applications 125). The second set of applications 125 execute on host computers or devices inside or outside of the server set's datacenter(s) for which the server set does not enforce policies.

To define and store policies, the server set 105 in some embodiments receives and stores definitions of several authorization policies for a number of API calls to a set of associated applications. In some embodiments, the server set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set 105 in some embodiments receives parameters for evaluating the policies. For one or more policy operand data sources 132 (e.g., from tenant LDAP directories, etc.) in the datacenter(s), the server set in some embodiments has one or more adapters that collect parameters from these data sources and store these parameters in order to evaluate the authorization policies to assess whether API calls should be authorized. The server set also allows such parameters to be entered through a web-based user interface.

For each set of related applications or machines (e.g., for each tenant in a multi-tenant datacenter), the server set in some embodiments stores the defined authorization policies and collected parameters in a single hierarchical storage structure 135. In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy, or stores one or more location-identifiers for one or more locations in the hierarchical storage structure at which the set of collected parameters is previously stored in the structure. The hierarchical storage structure in some embodiments is a namespace that stores the policies and the parameters for resolving these policies for the set of related machines.

In some embodiments, each authorization policy is defined by policy opcode in the namespace, while the parameter set for this authorization policy is defined as policy operands that are associated with the policy's opcode and that are stored in the namespace. The policy opcodes in some embodiments are written in a declarative language. Also, in some embodiments, the policy operands are written in a language-independent, structured format, such as JSON (Javascript Object Notation) format or YAML (initially, "Yet Another Markup Language" and later, YAML Ain't Markup Language). Typically, such formats (e.g., JSON, YAML, etc.) are human readable. Alternatively or conjunctively, in some embodiments, the policy operands are expressed in other formats, e.g., binary format, etc.

The server set in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the data source adapters of the server set identify operand updates by retrieving the updates from the data source 132 of the operands through data pull operations and/or by receiving the updates from these data source 132 through data push operations.

In some embodiments, the server set distributes the defined policies and parameters to local agents 120 that enforce these API-authorization policies for the applications 115, and these local agents 120 store the distributed policies and parameters in their local policy/parameter store 150. In some of the embodiments that store the policies and parameters in a namespace, the server set distributes different portions of the namespace to different host computers based on the policies that are relevant to the API-authorization processing for the first set of applications 115 executing on the different host computers. The different portions that are distributed to the different host computers can be overlapping in some embodiments.

For instance, to a first computer, the server set 105 distributes a first portion of the namespace that comprises policies and parameter sets relevant for processing API calls to a set of applications executing on the first computer, while distributing a second portion of the namespace that comprises policies and parameter sets relevant for processing API calls to a set of applications executing on the second computer, with the first and second namespace portions differing in that at least one policy and at least one parameter set of the first portion is not in the second portion. These two namespaces can either have no policies or parameters in common, or have one or more policies and parameters in common. Each local agent 120 stores its local portion of the namespace that it receives from the server set 105 in its local policy/parameter store 150.

In some embodiments, the server set 105 uses a push model to distribute the policy/parameters (e.g., the relevant namespace portions) to each local agent 120. In other embodiments, the server set uses a pull model to distribute the policy/parameters. For instance, in these embodiments, once a local agent initializes, it queries the server set for policies and parameters relevant to it. In these embodiments, the local agent also periodically polls the server set to determine whether policies or parameters that the local agent previously received have been updated on the server set and thereby need to be copied on the local agent's portion of the namespace. When such updates exist, the local agent retrieves them from the server set or receives them as part of its querying poll.

The local agent 120, executing on a host computer 110, receives requests to determine whether API calls received by one or more applications 115 executing on the host computer are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container). In other embodiments, the authorization module sends its API-authorization requests to the local agent through other mechanisms (such as IPC (inter-process communication) messages) that again, initiates above the network stack.

In response to such a request, the local agent 120 uses one or more parameters associated with the API call to identify a policy (e.g., policy opcode) stored in its local policy storage (e.g., stored in its local namespace) to evaluate in order to determine whether the API call should be authorized. The received API-authorization request contains one or more parameters associated with the API call (e.g., one or more parameters that identify the API call, its type and/or other metadata about the API call). In some embodiments, at least one parameter in the request is received by the application in the API call.

For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

To evaluate the identified policy for the API call, the agent might also retrieve one or more parameters (e.g., operands) from the local policy storage (e.g., from its copy of the namespace). The local agent then uses the received or retrieved parameters to evaluate the retrieved API-authorization policy in order to determine whether the API call should be approved or rejected. For instance, in some embodiments, the retrieved policy opcode includes one or more rules that specify one or more conditions for approving or rejecting the API calls. The agent resolves these conditions based on the received or retrieved parameter(s) associated with the API call (e.g., the agent determines that one or more received or retrieved parameters match a condition specified by the policy opcode for rejecting an API call).

Based on this evaluation, the local agent then sends a reply to the application that sent the API-authorization request, to specify whether the API call should be approved or rejected. In some embodiments, the local agent sends its reply to the API-authorization request as an RPC reply message. When the API call is approved, the particular application then performs the operation associated with the API call and, if necessary, returns an output to the source of the API call (i.e., to the module that sent the API call) to the particular application. On the other hand, when the API call is rejected, the particular application sends the message to the source of the API call to reject the call, or simply discards this call without providing a response to the source of the API call.

In some embodiments, the local agents operate in the same failure domain as the machines on which the applications execute. For instance, when an application executes on a virtual machine (VM) or container, the local agent in some embodiments executes on the same VM or container as the application. In other embodiments, the local agent does not execute on the same VM or container as its associated application, but executes on the same host computer as the application's VM or container.

In some embodiments, each local agent is associated with just one application that executes on the same computer, same VM or same container as the local agent. In other embodiments, one local agent in some embodiments can be shared by multiple applications that execute on the same VM, container, or host computer as the agent. However, in a multi-tenant datacenter, some embodiments do not allow local agents to be shared by applications executing on different tenants' computers, VMs or containers. Other embodiments, on the other hand, allow one local agent to be used by different applications of different tenants.

Some embodiments have the local agents operate within the same failure domain as the applications (e.g., micro service applications) in order to ensure that the policy functionality remains highly available and responsive at all times. Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

As mentioned above, the server set in some embodiments distributes policies and parameters to local agents so that they can evaluate API-authorization requests locally. Conjunctively or alternatively, the server set in some embodiments also processes API-authorization requests from some or all of the applications 115. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations and can be gradually rejected, or a limited access to the application can be provided until the API calls are authorized.

Accordingly, in some embodiments, an API-authorization module of an application executing on a computer sends an API-authorization request (e.g., as an RPC message) to a local agent on the same computer, and this local agent forwards this request (e.g., as another RPC message) to the server set. In other embodiments, the API-authorization module of the application sends the API-authorization request (e.g., as an RPC message) directly to the server set.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set then uses one or more parameters in the first parameter set to retrieve a policy (e.g., policy opcode) related to the API call from its policy/data storage 135 (e.g., from its namespace for the set of associated machines to which the application belongs). To evaluate this policy, the server set might also retrieve one or more parameters from its policy storage 135 that are relevant for assessing the retrieved policy (e.g., retrieve policy operands from its namespace for the set of associated machines to which the application belongs). These retrieved set of parameters serve as a second set of parameters associated with the API call.

The server set then uses the received or retrieved parameters to evaluate the retrieved API-authorization policy in order to determine whether the API call should be approved or rejected. For example, in some embodiments, the server set resolves one or more conditions specified in the retrieved policy opcode based on one or more received or retrieved parameters (e.g., determines that one or more received or retrieved parameters match a condition specified by the policy opcode for rejecting an API call). Based on this evaluation, the server set then sends a reply (e.g., an RPC reply message) to the local agent or the application's authorization module to specify whether the API call should be approved or rejected. When this response is sent to the local agent, this agent then relays this message (e.g., as an RPC reply message) to the application's API-authorization module.

As mentioned above, the local policy and data storage 150 and the server policy and data storage 135 of some embodiments are hierarchical namespaces that store both policy opcode and policy operands that are needed for resolving the policy opcodes (i.e., both the code and the data on which the code operates). In some embodiments, the namespace is a document database in that it has no tables and instead is laid out as a single hierarchical document. This document forms one global namespace that holds all the data and policies. For instance, the following namespace structure is a hierarchical layout of a policy-and-document database that stores three JSON data documents and two policies:

/a/b/doc_1.json
/a/b/doc_2.json
/c/d/doc_3.json
/d/policy_A

/e/f/policy_B

In this example, there are two JSON documents at namespace location '/a/b' and a third JSON document at '/c/d', while the two policies are saved at '/d' and '/e/f'.

As a namespace merges the data and policies into one global hierarchical layout, database clients can access a nested portion of the namespace simply by requesting data by its fully qualified name. Moreover, to access a portion of policy operand document 1, the client can simply request the data with name:

/a/b/doc_1/some_portion.

The same applies to policies: the namespace evaluates the policies on-the-fly when client accesses the namespace. That is, the client can simply access the results of a "policy evaluation" by referring the policy and its relevant portion. For instance, the client can request /e/f/policy_B/some_computed_result, which would make title database take the source of code of the policy B, compute the policy using any data necessary that the policy may need underneath and then pass the requested portion of the policy results back to the client.

Figure 2:
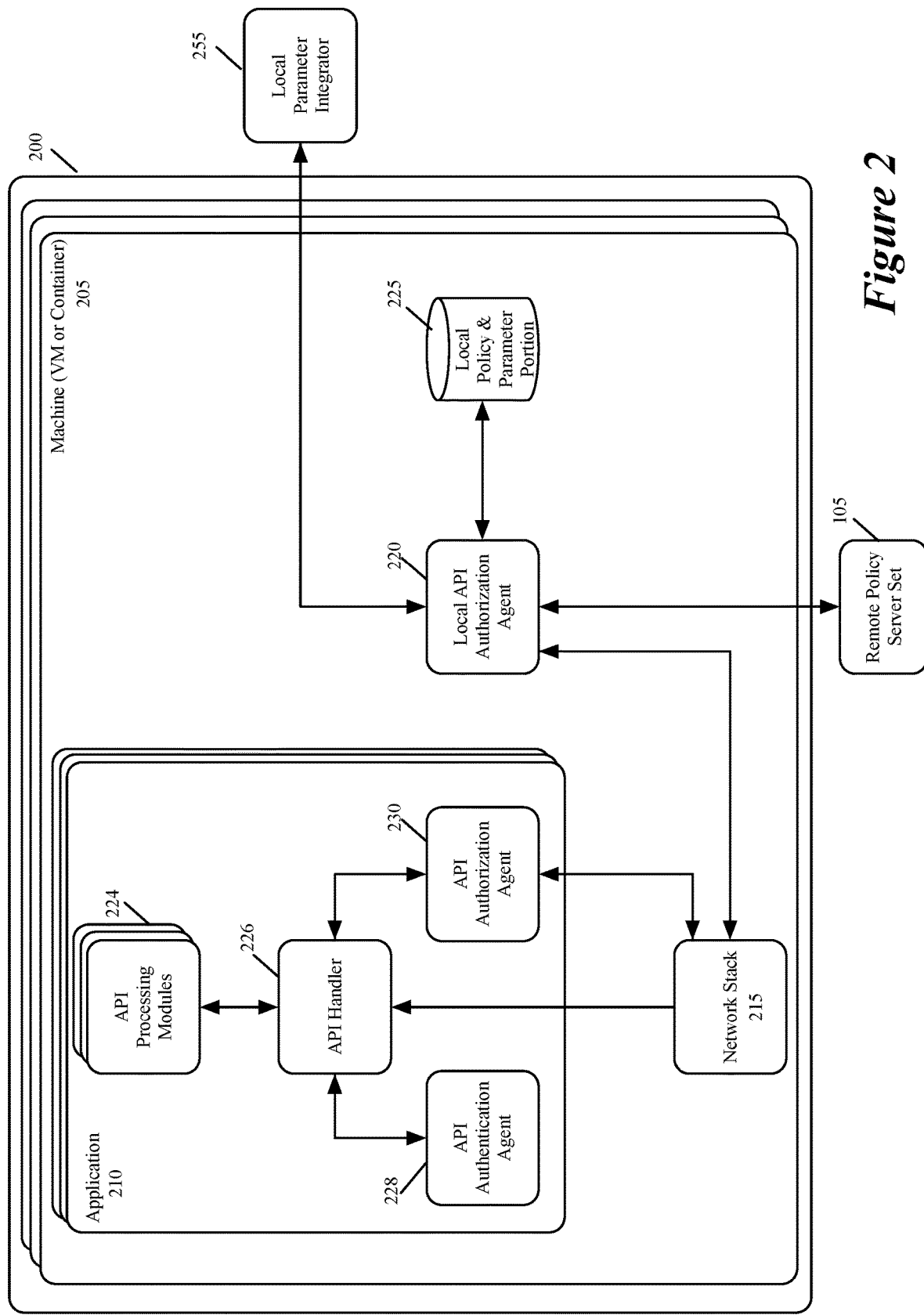
FIG. 2 illustrates the host-side software architecture of the API-authorization system of some embodiments.

FIG. 2 illustrates the host-side software architecture of the API-authorization system 100 of some embodiments. Specifically, it illustrates a host computer 200 on which multiple machines 205 (e.g., multiple VMs or containers) execute. On each machine 205, multiple applications 210 can execute to process API calls from other modules on the host computer 200 or on other host computers or devices in the same datacenter or outside of the datacenter.

In addition to these applications, each machine 205 also has a network stack 215 and a local API-authorizing agent 220. The network stack 215 is a software communication stack (e.g., TCP/IP stack) that implements a network communication protocol suite to allow the applications and processes of the machine 205 to communicate with each other, and with applications and processes executing outside of this machine (e.g., on the same host computer 200 or on other computers or devices). When the machine 205 is a container, its network stack is the network stack of the VM or operating system on which the container executes. Also, the network stack of a machine often connects with another module (e.g., a software switch) on the host computer, which, in turn, interfaces with a physical network interface card (NIC) of the host computer.

One set of communications that the network stack 215 facilitates is the communication between an application's API-authorizing agent 230 on an application and the local API-authorizing agent 220. As further described above and below, the network stack passes RPC data messages between the application agent 230 and the local agent 220. The local agent 220 enforces API-authorization policies for the applications that execute on the machine 205. Specifically, from the application API-authorizing agents 230 of the machine 205, the local API-authorizing agent 220 receives API-authorization requests for different APIs that the applications 210 receive.

For each such request, the local agent 220 retrieves the API-authorization policy associated with the request (i.e., associated with the API call to which the request pertains) from its local policy and parameter storage 225. The local agent 220 retrieves this policy by using one or more parameters that are associated with the API call and that were received with the API call or the API-authorization request. From the policy/parameter storage, the local agent 220 can also retrieve one or more parameters for evaluating this policy.

The local storage 225 stores policies and parameters that the server set 105 has previously provided to the local agent 220. In some embodiments, this storage also stores parameters that the local agent previously receives from a local parameter integrator 240. This integrator allows an entity in the datacenter (e.g., a tenant or a department) to separately provide some or all of the parameters for evaluating the API-authorization policies. For instance, this integrator allows the entity to export highly confidential parameters into an API-authorization policy enforcement node without providing these parameters to the server set 105.

The local agent 220 then evaluates the retrieved policy based on parameter(s) received with the API-authorization request, or retrieved from the local storage 225. Based on its evaluation, the local agent then determines whether the API call should be approved or rejected. The local agent then sends the application API-authorizing agent 230 that sent the API-authorization request a reply to specify whether the API call should be approved or rejected. In some embodiments, the API-authorizing agent 230 sends the API-authorization requests as RPC (Remote Procedure Call) messages, and the local agents send their replies to these requests as RPC reply messages.

In the example illustrated in FIG. 2, each machine 205 has its own local API-authorization agent 220. Each such local agent 220 on a machine 205 can process API-authorization requests from one or more applications 210 executing on the machine. Having the local agent 220 operate on the same machine as its associated application 210 is beneficial as in this way, both these components operate in the same failure domain, which improves the agent's availability and its speed of processing API-authorization requests. However, in other embodiments, the applications on multiple machines on a host computer share the same local agent. For instance, in some embodiments, the local agent operates as a service VM or container on a host computer, and applications on multiple VMs and/or containers use this agent to have their API calls authorized. Instead of having the local agent operate as a service VM or container in the user space, other embodiments have the local agent operate as another type of process on the host computer that is accessed by multiple applications on multiple VMs and/or containers on a host computer.

As shown in FIG. 2, each application has an API handler 226, an API-authentication agent 228, and one or more API processing modules 224, in addition to the API-authorizing agent 230. An API processing module 224 is a module (e.g., an object) that performs an operation based on an API call to it. The API authentication agent 228 is the module that authenticates the identity of the API-call's source (e.g., validates the access credentials associated with the API call). When the API call is authenticated, the API authorization agent 230 determines whether the API call is authorized (i.e., whether the operation associated with the API call should be performed). The API handler 226 is the module that initiates the authentication operation and authorization operation for each API call. In some embodiments, the API handler is implemented by authentication and/or authorization code of the API processing modules (e.g., this handler is implemented in some embodiments by authentication and authorization code within each API processing object of an application).

Figure 3:
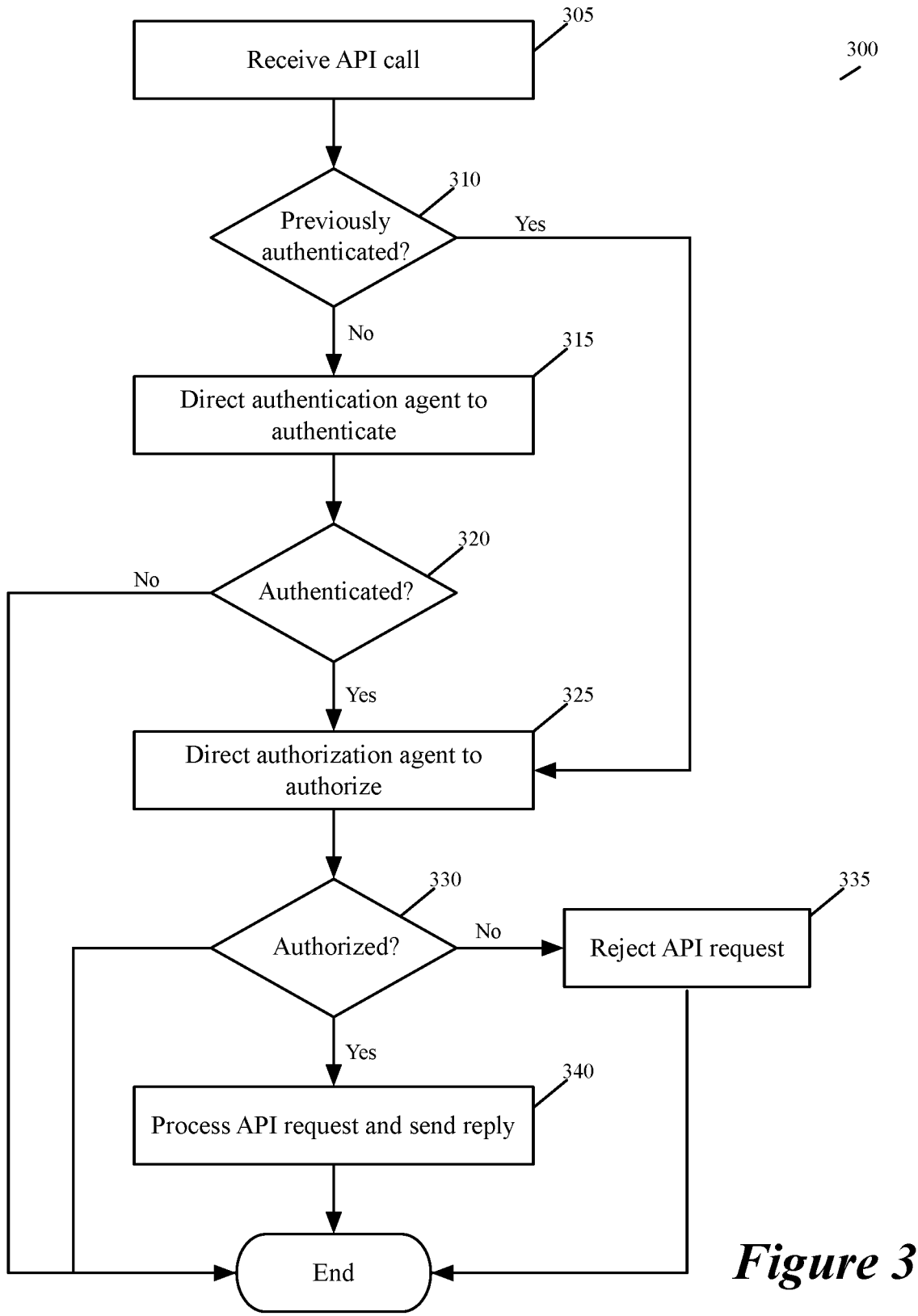
FIG. 3 illustrates a process that an application performs when it receives an API call.

To further explain the operations of the components of the application 210, FIG. 3 illustrates a process that an application 210 performs when it receives (at 305) an API call. In some embodiments, the application 210 performs this process only for an API call that relates to an application infrastructure operation. In other words, an application 210 does not call the local agent 220 in some embodiments for API calls that relate to an application's core logic operations. In other embodiments, the local agent 220 handles API-authorization requests for both core logic API calls and infrastructure logic API calls.

When an API call is received, it has to be authenticated in some embodiments to validate the identity of the source of the API call. The API handler 226 uses the API authentication agent 228 to authenticate the identity of the source of the API call, e.g., to authenticate the credential set (e.g., certificate, username and/or password) accompanying the API call. Accordingly, as shown, the API handler 226 initially determines (at 310) whether the received API call is part of a communication session that was previously authenticated by the authentication agent 228 (e.g., part of a communication session that the authentication agent 228 previously stored a cookie). If so, the process transitions to 325, which will be further described below. Otherwise, when the API call is not part of a communication session that was previously authenticated, the API handler 226 directs (at 315) the authentication agent 228 to authenticate the API call. In some embodiments, each API call has to be independently authenticated irrespective of whether any prior API call in the same communication session has been authenticated.

In some embodiments, the API authentication agent 228 authenticates (at 315) the identity of the source of the API call by authenticating the credential set that is part of the API call. The application receives an API call as part of one or more data messages, each of which has a header and a payload. The payload of each such message contains all or part of the API call and one or more associated parameters, e.g., parameters that provide the credentials (e.g., username, password, user identifier, group identifier, certificate, etc.) of the source of the API call.

In some embodiments, the API authentication agent uses modules (e.g., third-party credential authenticating programs) executing outside of the application 210 to authenticate the API call. In these embodiments, the authentication agent 228 passes a set of source-identifying parameters that identifies the source of the API call to the external module, so that this module can authenticate the source of the API call. One or more parameters in this set can be parameters that were received with the API call.

After directing (at 315) the authentication agent to authenticate the source of the API call, the API handler (at 320) determines whether the authentication agent 228 reply indicates that the API call has been authenticated. If not, the API handler discards the API call and the process 300 ends. In some embodiments, the API handler 226 not only discards the API call but also sends a reply to the source of the API call to reject the call.

On the other hand, when the authentication agent 228 authenticates the source of the API call, the API handler 226 directs (at 325) the application API-authorizing agent 230 to authorize the API call. In response, the application agent 230 sends an API-authorization request to the local API-authorizing agent 220. To do this, application agent 230 generates (at 325) an RPC message to the local agent 220 to pass along this request with information about the API call (e.g., one or more parameters that describe the API call and one or more parameters associated with this call). The network stack 215 passes this RPC message to the local agent 220.

After receiving the API-authorization request from application authorizing agent 230, the local agent 220 uses (at 325) one or more of the received parameters to retrieve a policy for authorizing the API call from the local storage 225. In the embodiments in which the local storage 225 stores the policy and associated parameters in a namespace, the local agent uses one or more of the parameters in the API-authorization request to retrieve policy opcode related to the API call from the namespace. To evaluate this policy opcode, the agent might also retrieve parameters (e.g., policy operands) from the local storage (e.g., from the namespace) that are associated with the retrieved policy.

The local agent then uses the received parameter set and/or retrieved parameter set to evaluate the retrieved API-authorization policy (e.g., the retrieved opcode) in order to determine whether the API call should be approved or rejected. In the embodiments that express each policy in terms of policy opcode that has one or more rules that specify one or more conditions for approving or rejecting the API calls, the agent resolves these conditions based on the received and/or retrieved parameters. For instance, in some embodiments, the agent determines that one or more parameters in the received parameter set and/or retrieved parameter set match a condition specified by the policy opcode for rejecting the API call. In some embodiments, the conditions can specify reasons for allowing an API call.

Some API-authorization policies are resolved only by reference to the received parameter sets (i.e., only specify conditions that just need the received parameter sets to be resolved). Other API-authorization policies are resolved only by reference to the retrieved parameter sets (i.e., only specify conditions that just need the received parameter sets to be resolved). Still other API-authorization policies are resolved by reference to both the received and retrieved parameter sets (i.e., specify conditions that need both the received and retrieved parameter sets to be resolved).

After evaluating the retrieved policy, the local agent then sends (at 325) a reply message to the application API-authorizing agent 230 to return the results of its evaluation (e.g., to specify whether the API call should be allowed or rejected). In some embodiments, this reply message is an RPC reply message that is directed back to the application agent 230 through the network stack 215. Once the application agent 230 receives the reply from the local agent 220, it passes the local agent's approval or rejection of the API call to the API handler.

After directing (at 325) the authorization agent to authorize the API call, the API handler (at 330) determines whether the application API-authorizing agent's reply indicates that the API call has been authorized. If not, the API handler discards the API call and the process 300 ends. In some embodiments, the API handler 226 not only discards the API call but also sends a reply to the source of the API call to reject the call.

On the other hand, when the authorization agent 230 returns a reply that indicates that the API call has been approved, the API handler 226 directs (at 340) the API-processing module 224 that is associated with the API call to perform the operation associated with the API call and to provide a reply message to the source of the API call to indicate the completion of this operation. In some cases, this operation requires an output to be generated and returned to the source of the API call or to some other destination. In these cases, the API processing module generates this output and provides this output to the source of the API call or to the other destination. After 340, the process 300 ends.

One of ordinary skill will realize that the process 300 is implemented differently in other embodiments. For instance, the API-processing application does not perform the authorization/authentication check operations of the process 300.

Instead, a proxy authentication/authorization application performs these operations. In these embodiments, the proxy first application intercepts an API call intended for a second application and sends a request (e.g., through RPC, IPC, etc.) to authorize this API call to the local agent. When the local agent authorizes this request, this proxy first application then passes the API call to the second application, while discarding this call when the local agent rejects this call. In some embodiments, the first application not only intercepts API calls to obtain authorization for these calls, but also intercepts these calls to first have them authenticated by a separate authentication service.

Also, the process 300 discards an API call when this call is not authenticated. In other embodiments, the process 300 does not discard such an API call. For instance, in some embodiments, the process 300 passes the authentication failure of an API call to the local agent. This agent then uses this failure like a received parameter to resolve one or more conditions associated with the policy (retrieved from its namespace portion) that it evaluates to determine whether to authorize the API call.

Figure 4:
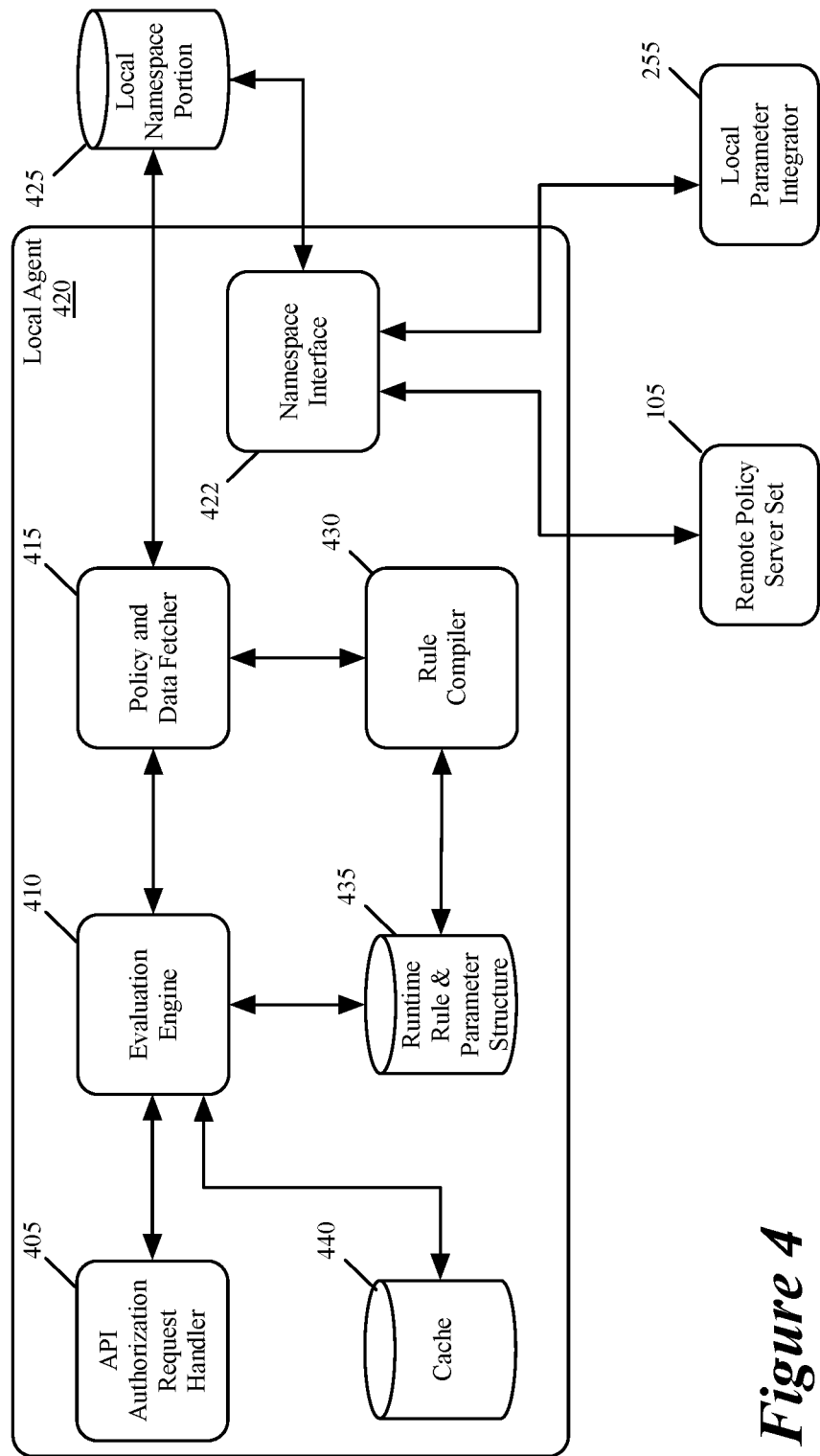
FIG. 4 illustrates a more-detailed view of a local agent of some embodiments.

FIG. 4 illustrates a more-detailed view of a local agent 420 of some embodiments. In this example, the local agent 420 uses a local namespace portion 425 as the local policy and data storage 225. This namespace contains both (1) policy opcodes to evaluate API calls to determine whether they should be authorized, and (2) operands to use to evaluate and resolve the opcodes. In some embodiments, the namespace portion 425 contains the policy opcodes and operands needed for the API calls that are received by one or more applications on the agent's host that use the local agent. In other embodiments, the local agent has a different namespace portion for different applications.

The local agent 420 has a namespace interface 422 that receives and stores the namespace portion and updates to all or part of this portion from the remote policy server set 105. This interface also receives policy operands from local parameter integrator 255, which, as mentioned above, can be used in some deployments to store policy operands in the namespace that are not provided to the server set 105 (e.g., to maintain the confidentiality of such policy operands). Upon the initialization of the local agent 420, the namespace interface 422 in some embodiments initially queries the server set to obtain the namespace(s) for the applications that will use the local agent. Also, in some embodiments, the namespace interface 422 periodically polls the server set to determine whether any policy or operand in its namespace has been added, deleted or modified, and if so, the namespace interface updates its local namespace portion 425 to reflect this change (e.g., to download any new and/or modified policy and/or operand and store the downloaded policy and/or operand in the namespace portion).

Figure 5:
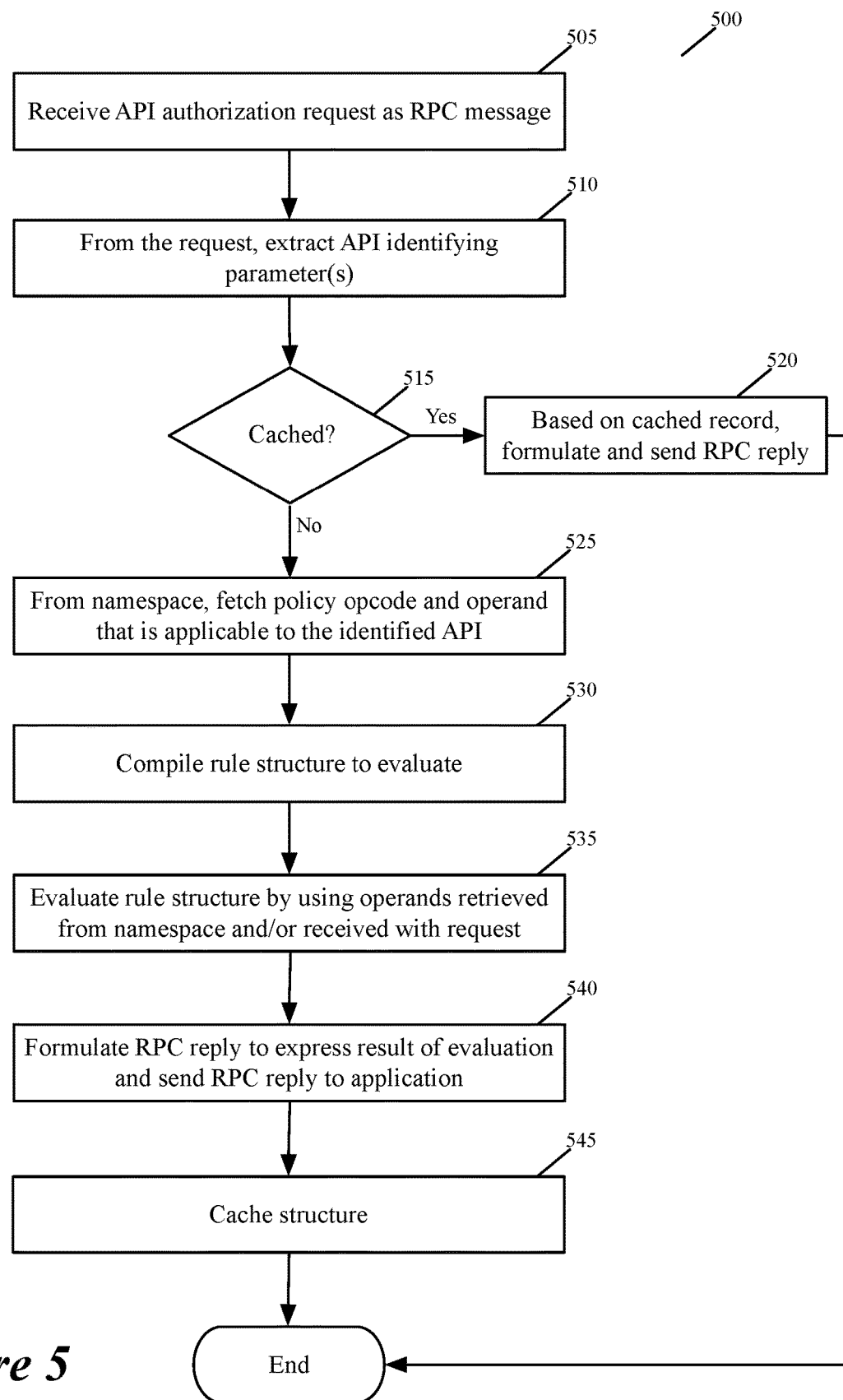
FIG. 5 illustrates a process that a local agent performs when it receives a request to authorize an API call from an API-authorizing agent of an application in some embodiments.

In addition to the namespace interface 422, the local agent 420 includes a request handler 405, evaluation engine 410, policy and data fetcher 415, and rule compiler 430. The operations of these modules will be described by reference to FIG. 5, which illustrates a process 500 that the local agent 420 performs when it receives a request to authorize an API call from an API-authorizing agent 230 of an application 210 that executes on the same host as the local agent 420.

As shown, the process 500 starts (at 505) when the agent's API-authorization request handler 405 receives an API-authorization request from the application's agent 230. This request is received in some embodiments as an RPC message that includes a set of parameters associated with the API call that the application has received. In some embodiments, this parameter set includes a parameter that identifies the API call and one or more metadata parameters associated with the API call. Also, in some embodiments, this parameter set includes one or more parameters that the local agent needs to resolve policy opcode that is associated with the API call and that is retrieved from the local namespace portion 425 by the local agent. Accordingly, after receiving the RPC message, the handler extracts (at 510) this parameter set from the RPC message's payload and provides this parameter set to the evaluation engine 410. This parameter set identifies the API call as mentioned above.

The evaluation engine is responsible for evaluating policy opcode related to the API call (i.e., the API call specified in the API-authorization RPC message) based on one or more parameters received with the RPC message and/or retrieved from the local namespace. Before evaluating this opcode based on one or more associated parameters, the evaluation engine needs the policy and data fetcher 415 to retrieve from the local namespace portion 425 the policy opcode and operands applicable to the identified API call, and the rule compiler 430 to create a more optimal runtime rule and parameter structure 435 for the evaluation engine to process. The evaluation engine also stores compiled rule structures for prior API-authorization requests in a cache storage 440, so that it can forego retrieving and compiling the same policy opcode/operands when it subsequently receives the same API call.

In view of this functionality, after identifying (at 510) the API call associated with the received request, the evaluation engine determines (at 515) whether the cache storage 440 stores a reference to a rule structure for this API call that was previously compiled when the local agent received the same API-authorization request previously. In some embodiments, the cache 440 identifies each stored rule structure in terms of one or more parameters that are passed along with the API-authorization request to the local agent 420 by the API-authorization agent 230. Hence, in these embodiments, the evaluation engine determines whether the parameters passed along with the current request matches the parameters stored for the rule structures identified in the cache storage 440.

If so, the evaluation engine processes (at 520) this previously specified rule structure to formulate its decision, and then provides (at 520) its decision (i.e., its "authorization" or "rejection") to the request handler 405. At 520, the API handler then formulates an RPC reply message with this decision in its payload and sends this reply message to the authorization agent 230 that sent the request. After 520, the process 500 ends.

On the other hand, when the evaluation engine determines (at 515) that the cache storage does not store a reference to a previously defined rule structure for the API call identified in the received request, the evaluation engine directs (at 525) the policy and data fetcher 415 to retrieve from the local namespace portion 425 the policy opcode and operands applicable to the identified API call. As described above and further described below, the namespace is a hierarchical structure that stores policy opcode associated with an API call in a location (e.g., a path) in the structure that can be specifically identified based on the API call's identifier (e.g., the name associated with the API call). In some embodiments, this location also stores the operands needed for processing this policy opcode and/or stores a location identifier (e.g., the path) that specifies other location(s) in the namespace that store the operands needed for processing the policy opcode. Hence, in some embodiments, the fetcher 415 can easily identify the policy opcode and operands to retrieve by just using parameters associated with the API call.

After retrieving the policy opcode and one or more associated operands, the fetcher 415 directs (at 530) the rule compiler 430 to create a more optimal runtime rule and parameter structure 435 for the evaluation engine to process. As described above, the policy opcode for an API call includes one or more rules, with each rule expressing one or more conditions for rejecting (or allowing) the API call. In some embodiments, the optimal runtime rule and parameter 435 structure includes "prepared rules" that are generated by the compiler. Prepared rules are rules that are parsed from the retrieved, compiled and optimized policy opcode that is retrieved by the fetcher for the API call.

Prepared rules are ready for execution and thus require less effort to execute. In some embodiments, the prepared rules are expressed using an abstract syntax tree (AST). Some embodiments translate the AST into a sequence of executable instructions. These instructions are virtual instructions (not CPU instructions) that are easy to run fast, and even further optimize for speed. Some embodiments use known processes to compile and process prepared rules from declarative language code. Some of the known processes are described in Handbook of Automated Reasoning by Alan Robinson and Andrei Voronkov.

Once the rule compiler creates (at 530) the more optimal rule structure, it notifies (at 535) the evaluation engine 410 directly or through the fetcher 415. The evaluation engine then processes (at 535) the rules in this rule structure. In some embodiments, the evaluation engine uses the parameters retrieved from the namespace and/or received with the API request to resolve these rules (e.g., conditions specified by the rules).

After processing (at 535) the rule structure, the evaluation engine 410 provides its decision with respect to the API call (i.e., the "authorization" or "rejection" of the API call) to the handler 405. At 540, the handler then formulates an RPC reply message with this decision in its payload and sends this reply message to the authorization agent 230 that sent the request. Next, at 545, the evaluation engine stores in the cache 440 a reference to the optimized rule structure that it created at 530. This cached result can be kept as long as the retrieved policy opcode does not change: that way the evaluation engine can skip the parsing/compiling/optimization part (which can be more time consuming) and quickly start executing with minimal effort. As mentioned above, the evaluation engine 410 stores the cached rule structure by using a reference that is associated with one or more parameters that were received with the API call or the API-authorization request. After 545, the process ends.

In some embodiments, the process 500 not only caches the optimized rule structure for an API call's retrieved policy, but also caches the decisions that it reaches in processing the rule structure for a particular set of parameters. However, as each decision is dependent on the set of parameters that can dynamically change or can resolve the rules differently at different times or under different conditions, the process has to ensure that the previously cached decisions are still valid at a later instance in time when the API call is received again.

As mentioned above, the local agents in some embodiments are used to authorize API calls for both application domain logic and application infrastructure logic, while in other embodiments, the local agents are used to authorize API calls for application infrastructure logic but not application domain logic. Also, as mentioned above, decoupling API authorization for infrastructure logic simplifies the application code and allows the application's code to focus on the matters relevant to the application's core functions. This is especially the case because while infrastructure functions are critical, they are not typically a concern of the application domain logic.

For instance, in banking, it is the infrastructure part of the application that is responsible for maintaining micro-services' connections to an account database holding the actual account data (there could many of those), providing the necessary HTTP facilities to allow the customers' browsers to retrieve their account contents (customers would expect SSL, for instance), as well as providing connectivity between micro-services (modern applications include several micro-services which then together form the application).

Both core logic and infrastructure parts require authorization in their operations. However, the type of authorization implemented is different: core logic implements authorization decisions over the core data and operations, while the infrastructure parts implement authorization decisions for the functionality they provide.

This implies that core logic is likely to implement authorization decisions that are fundamentally tied to the logic being implemented. For instance, in banking, there are restrictions about the mortgage offer approvals, between which account transfers can be moved without further security inspection (bank internal transfers are less risky compared to transfers to other banks), or between which kind of accounts fund transfers are allowed to begin with (a savings account could have restrictions for the number of transfers done per month). Even the size of the transfer itself is likely to affect the authorization decision.

Similarly in healthcare, the core logic is the one that is responsible for health care data and operations over it: creation and filling prescription is likely to involve several authorization steps that are tied to the processing of the prescription data. For instance, heavy painkillers are likely to have more strict authorization logic in place to allow the creation of the prescription to begin with.

On the contrary, authorization within the infrastructure parts of the application and micro-service revolve around the infrastructure level entities. The authorization decisions are about whether a micro-service can talk to another, which micro-service API calls can invoke, or whether a micro-service can open a connection to a particular database instance and read a particular table. For business logic, these are low-level details that are typically invisible to the end user.

Application infrastructure level authorization is also relevant and related to the managing of the application and micro-service as whole. For example, a micro-service instance might run inside a VM and the type of a micro-service is likely to affect who (and when) can access the VM. For instance, it is common to block all access by default and allow access only as-needed basis. In that case only the people actively resolving an incident related to application are allowed to access the VM and hence the application deployment. While this does not concern the application instance itself (a process running a micro-service instance is not responsible for managing the VM the process runs within), these authorization decisions can be considered to be part of application infrastructure authorization.

As mentioned above, the server set 105 in some embodiments collects and updates parameters for resolving policies dynamically and in a deployment specific manner (i.e., in a manner that can be context specific for each set of associated machines for which the server set is deployed). This allows policies to be resolved based on conditions and dynamically changing parameters that are specific to each deployment. As further described below, the server set allows the values for policy operands to dynamically change because it allows local agents to receive (through push operations or pull operations) such changes for the policy operands in the respective namespaces of the local agents.

Figure 6:
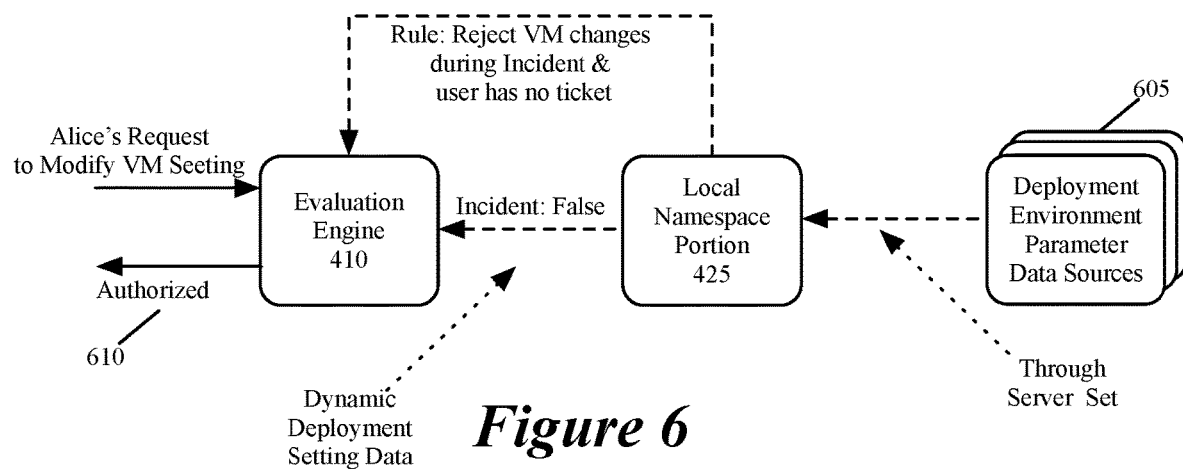
FIGS. 6-8 present three examples that illustrate resolving the same API authorization request based on deployment specific policies and operands with the values of the operands changing dynamically based on network conditions.
Figure 7:
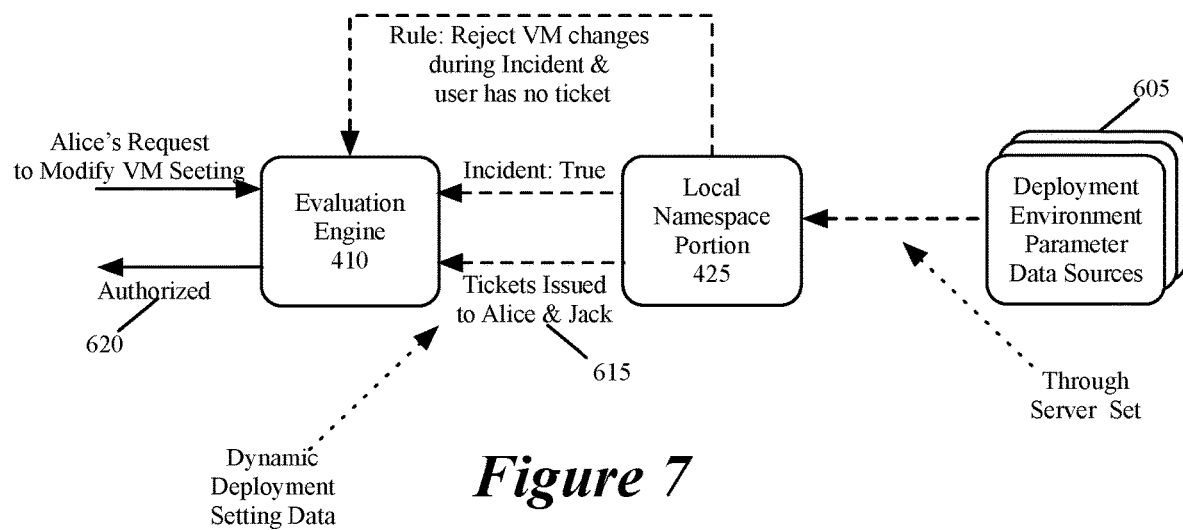
Figure 8:
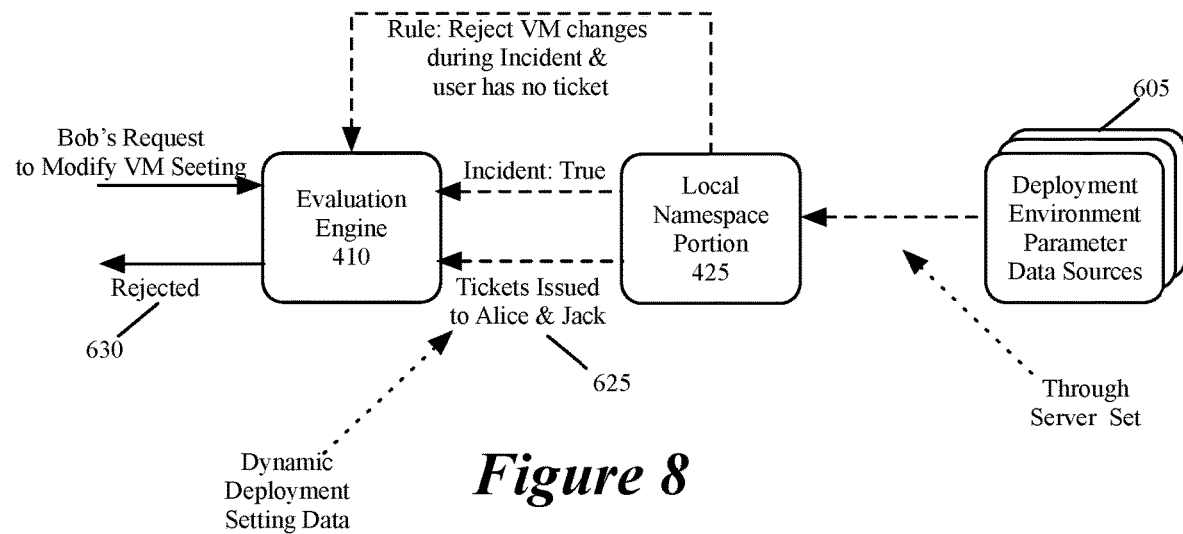

FIGS. 6-8 present three examples that illustrate the evaluation engine 410 of a local agent resolving the same API authorization request based on deployment specific policies and operands, with the values of the operands changing dynamically based on network conditions. In these examples, the same application (not shown) sends three requests to the evaluation engine to authorize an API call associated with changing a setting of a VM. Also, in each of these examples, the evaluation engine processes the same API-authorization policy, which includes one rule that specifies that modifications to the VM settings should be rejected during time periods in which an incident is being reported for the VM's host computer unless the user requesting the setting change has been issued a ticket, such as a user-authentication ticket or a project tracking ticket. In some embodiments, the ticket would be issued by a third-party ticketing application such the Jira Issue and Project Tracking applications of Atlassian.

In these examples of FIGS. 6-8, the policy being enforced is custom-defined for a deployment of the policy enforcement system 100 of some embodiments. While this deployment restricts VM modifications during incidents, another deployment of the policy enforcement system might not. Other deployments might not even have any VMs; they might only have standalone computers or they might only use containers. Moreover, in these examples, the operands for resolving the specified VM-modification policy dynamically change. Specifically, these operands include (1) the Boolean Incident flag and (2) array that specifies identity of the users with tickets (if any). Both the Boolean parameter and the ticket array can be changed at any time. The Incident flag is false when there is no issue in the VM's host computer, while it is true that when there is an issue in the VM's host computer. Also, each time a user obtains a ticket for performing a task, the user's identity is added to the ticket array. The user's identity is removed from the ticket array when the ticket expires. All of these parameters are deployment specific and can change dynamically in real time.

As mentioned above, the agent's local namespace portion 425 in some embodiments is updated (through push or pull operations) whenever policy opcodes and/or policy operands in the copy of the namespace that is maintained by the server set 105. Similarly, the server set's copy of the namespace is updated whenever a new policy is added, modified or deleted, and/or an operand's value changes through the various policy input interfaces and operand import interfaces of the server set.

Accordingly, whenever the Incident flag changes its value or whenever a user is added or removed from the ticket array, the server set's operand import interfaces modify the values of the Incident flag and the ticket array. From this namespace, these changes are propagated to the agent's local namespace portion 425 through push operations or pull operations. The examples illustrated in FIGS. 6-8 provide an abridged view of this propagation by showing data being sent from one or more data sources 605 in the deployment environment to the local namespace portion 425. These figures also do not show the policy and data fetcher 415, the rule compiler 430 and the created runtime rule and parameter structure 435 in order to keep the illustrations in these figures simple. Instead, these figures just show the evaluation engine 410 receiving the VM-modification policy's rule that specifies that VM changes should be rejected during an incident when the requesting user does not have a ticket. These abridged representations are illustrated with dashed arrows in these figures.

FIG. 6 illustrates the case when the VM modification API call is received when there is no incident. Thus, in this example, the evaluation engine sends a reply 610 that indicates that the API call is authorized. FIG. 7 illustrates the case when the VM modification API call is received when there is an incident and the user associated with this API call is Alice. As shown, the ticket array 615 identifies Alice as someone who has been issued a ticket. Accordingly, in this example, the evaluation engine sends a reply 620 that indicates that the API call is authorized. FIG. 8 illustrates the case when the VM modification API call is received when there is an incident but the user associated with this API call is Bob. As shown, the ticket array 625 does not identify Bob as someone who has been issued a ticket. Accordingly, in this example, the evaluation engine sends a reply 630 that indicates that the API call is rejected.

FIG. 9 illustrates an example of the policy opcode and operand that can be used to implement API-authorization controls similar to those of the examples illustrated in FIG. 6-8. Unlike the examples of FIGS. 6-8 that resolve one rule, the policy opcode in the example of FIG. 9 has three rules. To resolve this policy opcode, three sets of parameters 902 are identified in-line within the policy opcode for authorizing API calls regarding VM modifications. These three sets of parameters specify an LDAP group directory, a data store specifying occurrences of incidents, and a JIRA ticketing data source.

A first rule 905 specifies that a VM-modification API call should be allowed if the call comes from a user in the engineering staff during a period in which VM-modifications are not blocked. The second rule 910 defines whether the current time period (i.e., the period during which the VM-modification API call is received) is a time period that the VM-modification call should be blocked. This rule specifies that the current time period is a blocked time period if the Boolean Incident flag is currently true and there is no temporary exemption. The third rule 915 defines whether an exemption should be granted during an incident for the user associated with the received API call. This rule specifies that a temporary exemption should be granted if the ticket array includes the user identity and the issues label for this user in the labels array identifies the ticket to be associated with the existence of an incident.

Based on these rules, the evaluation engine will authorize VM-modification API calls from anyone within the engineering staff (as identified by the LDAP directory) when there is no incident. It will also authorize such calls during an incident from anyone within the engineering staff when the user has a ticket associated with incidents. However, it will reject such calls during an incident from anyone that does not have a ticket associated with the incident.

The above-described local API-authorization request processing of FIGS. 2-9 has several advantages. First, by packing the relevant portion of the namespace with both policies and data parameters for resolving these policies, and then providing this portion to a local agent executing on the same host computer as the applications that need their API calls authorized, this API-authorization request processing is fast and highly available. No remote device has to be accessed to process these requests.

This approach can also cache the optimized rule data structure for the API-authorization policy opcode associated with an API call after this structure is created for assessing whether the API call should be allowed. This cached rule data structure can be subsequently use for processing requests associated with the same API call. In this manner, the cached structure eliminates the need for the rule compiler to recreate the optimized rule structure while the local agent processes the authorization request with the subsequent iterations of the same API call.

As mentioned above, the local API-authorization request processing of some embodiments also caches decision. Whenever decisions are cached, the system has to address cache revocation. Revoking cache decisions when policies are enforced by a central set of servers is complicated. A centralized approach might use rather long caching timeouts to maximize the efficiency of its decision caching. But this would then require some mechanism to explicitly detect which cached decisions have to be revoked when a policy or data changes. Otherwise the local cache could store stale decisions for long periods of time, before they timeout and replaced with new ones matching the updated policy and data.

To figure out the decisions to revoke from cache, the application in the centralized approach would have to keep track of policies and data used in the decisions it receives from the centralized location—and then the centralized decision maker would have to inform the application if any of these changes. This is convoluted at best: to support revocation, the interface between application and centralized decision maker has to deal with policy and data information that they would not otherwise even need. After all, the authorization decisions are executed centrally, outside of the application, yet somehow applications would have to understand the data and policies used in those decisions so that they could cache those decisions. As a result, the interface between the application and central location would now include information about data, policies and decisions.

On the other hand, in the above-described local API-authorization request processing of FIGS. 2-9, the interface between the application and decision is just about namespace (i.e., about the policies and data). The entire namespace bundle comes with a single version that the application can use to check if the central location has any updates for this portion of the namespace. This results in much simpler and reliable interface between the application and central location.

One of ordinary skill will realize that FIGS. 6-9 only provide some examples that describe the operations of some embodiments of the invention. The API-authorization system of some embodiments can be used to resolve many other API-authorization policies dynamically. Moreover, even the operations described in the examples of FIGS. 6-9 are implemented differently in different embodiments. For instance, instead of relying on an incident flag to determine whether there is an incident associated with a host computer, VM or container on which an API-processing application executes, the evaluation engine 410 dynamically computes this parameter (i.e., dynamically determines whether there is an incident). To dynamically determine this parameter, the evaluation engine 410 in some embodiments could direct the fetcher 415 to iteratively retrieve different policies and/or operands from the namespace as the evaluation engine processes the optimized rule structure 435. The incident parameter could then be the result of one or more of these retrieval and processing operations.

Figure 10:
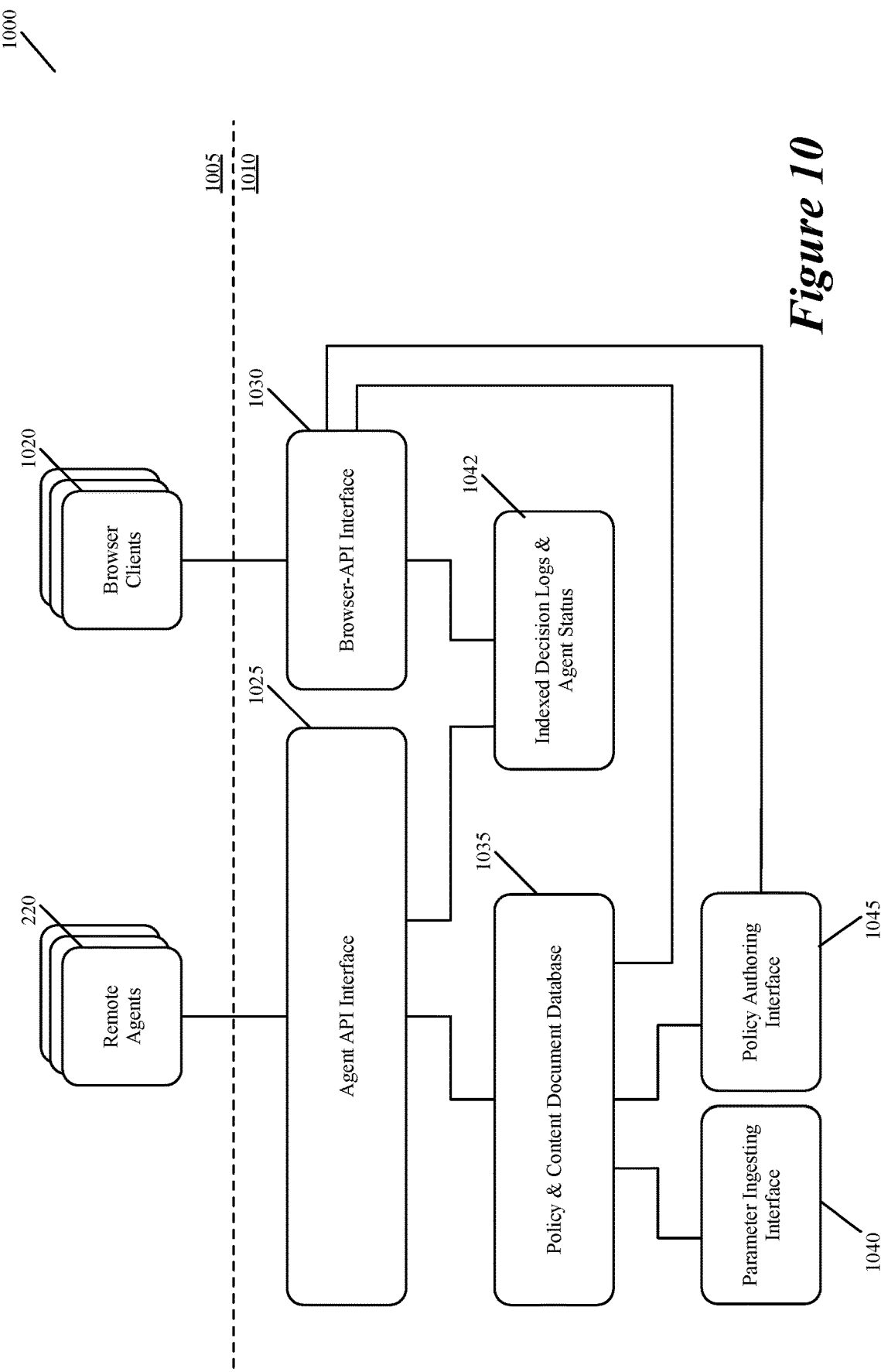
FIG. 10 illustrates the software architecture of the server set of some embodiments of the invention.

FIG. 10 illustrates the software architecture of the server set 105 of some embodiments of the invention. Two or more servers in some embodiments can implement the server-side modules 1010 in this architecture. Also, in some embodiments, multiple instances of the same modules execute on different servers in the server set 105 as this server set has two or more servers performing the same operations in these embodiments. As shown, the server set 105 includes local-agent API interface 1025, browser-API interface 1030, policy and content document database 1035, indexed decision logs and agent status data storage 1040, parameter ingesting interface 1040 and policy authoring interface 1045.

The interfaces 1025 and 1030 communicatively connect the server-side modules 1010 to client-side modules 1005. Specifically, the browser interface 1030 processes communications between the server set's modules and the browser clients, while the agent interface 1025 processes communications between the server set modules and the remote local agents 220 on the host computers.

The local agents 220 communicate with server modules 1010 by using APIs of the server's agent interface 1025. This interface includes (1) a download API that provides the functionality to download a bundle of policies and related data, and then request its next version, if a new version is available, and (2) an upload API that provides the functionality for the agents to report back any policy decisions they have made. The download API accesses the document database underneath to compile the policies and any of their dependencies (whether they are data or other policies) into a bundle. In some embodiments, the agent interface 1025 provides local namespace portions and updates to these portions in response to queries for the namespaces and updates to the namespaces. The upload API uses a separate decision database to log any decisions clients have reported.

As mentioned above, the policy and content document database 1035 in some embodiments is a custom namespace database. This database can persist both policies and any data the policies need in their evaluation. In some embodiments, the database saves policies as plain source code, while storing the data as JSON documents. The policy and content database 1035 in some embodiments includes a hierarchical namespace for each entity in one or more datacenters for which the server set defines and distributes API-authorization policies. As this database 1035 merges the data and policies into one global hierarchical namespace layout, database clients can access a nested portion of the namespaces simply by requesting policy operands by their fully qualified names.

The server set copy of the policy and content database 1035 in some embodiments can save all versions of the data and policies over time for an entity. When either a data or policy is updated, its previous version is not removed but archived in some embodiments. This allows time traversal: the server set can inspect the state of policies and their related data at any point in time by simply defining the time of interest when accessing the namespace. Time traversal is useful for troubleshooting (to understand exactly what was the state of the policies at the time of an issue) and for auditing (to convince oneself the system state was correct throughout the audited period of time). Also, in some embodiments, the policy and content database 1035 implements delta-encoding to avoid saving entire copies of all data and policies after each, potentially small, change. This is very effective as most of the data is rather stable with only a steady stream of fairly local changes over time.

As mentioned above, policies refer and use deployment-specific parameters describing the current state of the managed resources and datacenter. To retrieve and properly format the parameters for consumption, the server set uses the parameter ingesting interface 1040 in some embodiments. The parameter ingesting interface 1040 includes one or more data source adapters, each capable of using a remote management API of a parameter data source to collect deployment specific parameters (e.g., through data crawl operations) and transforming the collected parameter data from its native format into a structured document (e.g., a JSON document) for storing in the database 1035. For instance, when the API authorization system validates API requests to micro service applications deployed in Amazon Web Services (AWS) cloud infrastructure, the parameter ingestion interface 1035 has one or more data source adapters to collect data needed for processing different AWS APIs.

In case a relevant data is easily accessible from a database, the parameter-ingesting interface 1040 includes a data source adapter that can implement the relevant database access protocol and directly replicate the relevant portion of the remote database. For instance, in some embodiments, a data source adapter is used to retrieve user group information from a remote user directory by using LDAP protocols.

The policy-authoring interface 1045 in some embodiments provides resources that allow the server set to generate policies for an entity. In some embodiments, this interface is accessible through bowser clients 1020 and the browser interface 1030. Policies in some embodiments can also be uploaded to the server set through an API interface.

In some embodiments, the decision and status storage 1042 is a database that stores the received decision log entries for archiving. An indexing engine (not shown) builds a text search index over the stored decision log entries. The index is useful for the UI component as it enables running queries about the decisions, e.g., during troubleshooting when a particular application is not operating as expected and the related policy decisions need to be further inspected. The browser clients 1020 in some embodiments are JavaScript applications. Through the browser API interface 1030, the browser clients 1020 can access the underlying databases/indices. This allows the browser clients 1020 to access any current or past policy/parameter state, as well as allow inspection of the policy decisions done.

The policy defining and distribution system of FIG. 10 has several advantages. It imports remote management API state (e.g., as JSON objects) in the document database, which allows the system to effectively construct a logical, centralized view of the datacenter state. This combined with versioning allows the system to provide versioned snapshots of the entire datacenter state, if needed. For example, in some embodiments, the local agents identify the namespace versions that they use to process the API-authorization requests and provide this version information to the server set to store in the decision logs 1042. Subsequently, through the browser interface 1030 and the decision logs 1042, a user can perform browser-based searches to extract the exact state of the policies and parameters at the time a decision was made. This state information includes the version data. The version data can also be used to search the decision logs. These capabilities are highly useful for debugging the API-authorization system. These search and debug operations are also supported in some embodiments through API interfaces that support API calls from automated processes that collect and process log data.

Also, the system's overall process of extracting remote management APIs, disseminates relevant pieces of this data together with the relevant policy code for the agents. This is near real time dissemination of management state is highly beneficial that current techniques cannot duplicate. Current systems integrate with the necessary remote management APIs on their own, which creates $N^2$ integrations, whereas the system 100 can do the integrations once, which results in N integrations.

The system 100 also uses a declarative policy language for document-oriented, structured data. Also, as mentioned above, the system 100 in some embodiments decouples policy (authorization) logic from the applications to an agent nearby. In a traditional authorization solution (e.g., using LDAP), the policy logic is part of the application source code and application directly retrieves the relevant data from the LDAP, applying its logic on the data retrieved.

As noted above, some embodiments of the invention provide a system for defining, distributing and enforcing policies for authorizing Application Programming Interface (API) calls to applications executing on one or more sets of associated machines (e.g., virtual machines, containers, computers, etc.) in one or more datacenters. An entity can use this system to control the behavior of the entity's software systems, e.g., cloud machines, on-premise machines, or SaaS machines. The API authorization system in some embodiments provides policy enforcing agents co-located with entity machines (e.g., virtual machines, containers, standalone servers, etc.) along with policy and contextual data storages that store the entity's managed policies and contextual data. Alternatively, or conjunctively, the API authorization system includes controllers that configure the entity's policy enforcing agents with the appropriate API processing policies and data.

To provide such services to an entity, the entity has to trust the API authorization system to provide the correct policies and contextual data to the agents involved in the API authorization operations. This is the case even when the entity runs all the data sources locally on-premise (e.g., to import contextual data for their policies from their on-premise systems), runs all controllers on-premise (to manage their system APIs based on policies they uploaded to API-authorization system), and runs policy agents on-premise near on-premise entity application/service machines (e.g., consults on-premise policy agents to policy decisions).

In any of these implementations, the policy and contextual data are exchanged between the API-authorization system's machines and the entity's machines. In such cases, the entity needs to have high confidence in the integrity of the trust chain. The entity needs provable guarantees that nothing alters the policies that the entity wrote, or modifies the contextual data downloaded from the entity's systems, from the moment the entity uploaded them to the moment they are consumed by agents running on-premises and enforcing them.

To solve this, the API-authorization system uses cryptographic signatures in some embodiments. This approach allows the entity to sign its policies, as well as the contextual data extracted from the entity's systems, before they are uploaded to the API-authorization system. When the policies and data are downloaded by the local agents (e.g. local agent 220), the agents can verify the signatures, and this ensures that no one tampered with the data when the signature proves to be valid. Furthermore, since the signing keys are never uploaded to API-authorization system service, only someone at the entity's premises can generate the signatures. As a result, the cryptographic signatures reduce the possibility of compromise of the API-authorization system only in terms of reduced availability: at most, someone can hack the system to send policies and data with invalid signatures, which are then rejected by the agents, effectively creating a denial of service attack.

Some embodiments, however, do more than plain cryptographic signatures. This is because the API-authorization system filters down the data downloaded in the bundles with the policies in order to reduce the amount of contextual data sent to the controllers and policy agents. In other words, the system does not send the entity-provided contextual data as such. It does this filtering by executing static analysis over the policy code, trimming out any data that will not be used by the policies. This comes with a side-effect as this trimming would invalidate ordinary cryptographic signatures protecting the data. In some cases, trimming of the policies is less of an issue and requirement since the policies are smaller. Hence, in some cases, ordinary signatures will work to guarantee the integrity of policies as they are not trimmed.

To allow for the signing of trimmed contextual data, the API-authorization system of some embodiments signs structured documents that contain the contextual data. This solution makes the data signature computation aware of the structure of the document (e.g., JSON document) signed. In a prior art signature scheme for generic data, the signature is computed for a cryptographic hash that is then computed over the byte stream representing the entire document as it is presented on the wire. Instead, the API-authorization system of some embodiments makes the signatures aware of the structure of the document, by computing the hash using a hash tree.

The contextual data (i.e., the policy operands which are sets of parameters for evaluating the policies as inputs to the policy opcodes) can be represented in some embodiments as elements of the structured document. In some embodiments, these elements have values, and parent-child relationships with other elements. The document structure arises from arranging the elements in a hierarchical structure to represent the parent-child relationships between elements. The hierarchical structure can be represented in some embodiments as a graph, e.g. a directed acyclic graph (DAG), for example a tree with branches. Each node of the tree corresponds to an element of the structured document, and the values of each element (i.e., at a given node) correspond to the sets of parameters that are used to evaluate the policy. The branches of the tree beneath an element represent child elements, and each child element is potentially a parent element for additional child elements, etc. In the discussion that follows, the term node includes a set of elements each of which has a value, and the term branch indicates a node as well as any child nodes.

Figure 11:
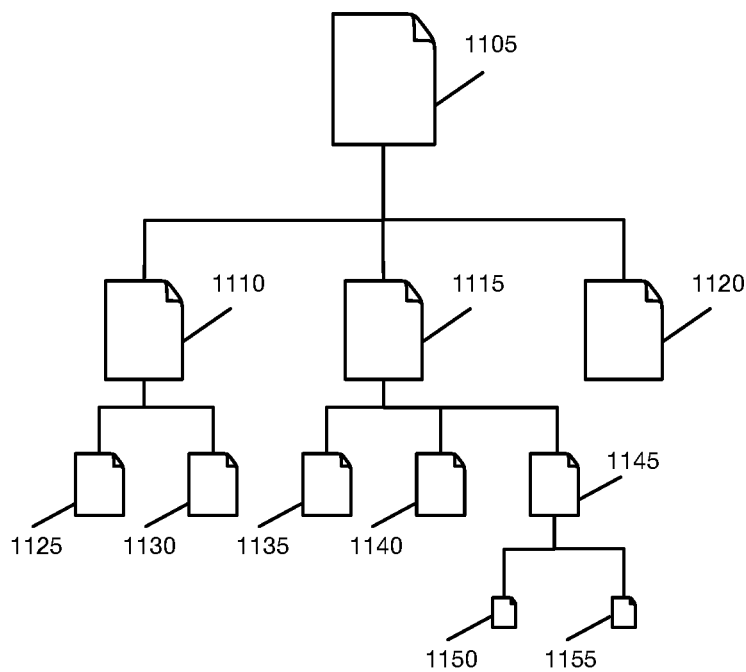
FIG. 11 conceptually illustrates an example of a structured JSON document of some embodiments containing contextual data for evaluating policies.

A conceptual example of a structured JSON document 1105 containing contextual data for evaluating policies is conceptually illustrated for some embodiments in FIG. 11. Each node in the JSON document 1105 represents a set of parameters for a policy associated with the document. For example, the JSON document 1105 includes three branches 1110-1120. The branch 1110 includes two sub-branches 1125 and 1130, and the branch 1115 includes three sub-branches 1135-1145. The sub-branch 1145 includes two further sub-sub-branches 1150 and 1155. In the conceptual example of FIG. 11, nodes 1120-1140, 1150, and 1155 do not contain any child nodes. However, conceptually any node in the JSON document 1105 could contain additional branches without any loss of generality.

Figure 12:
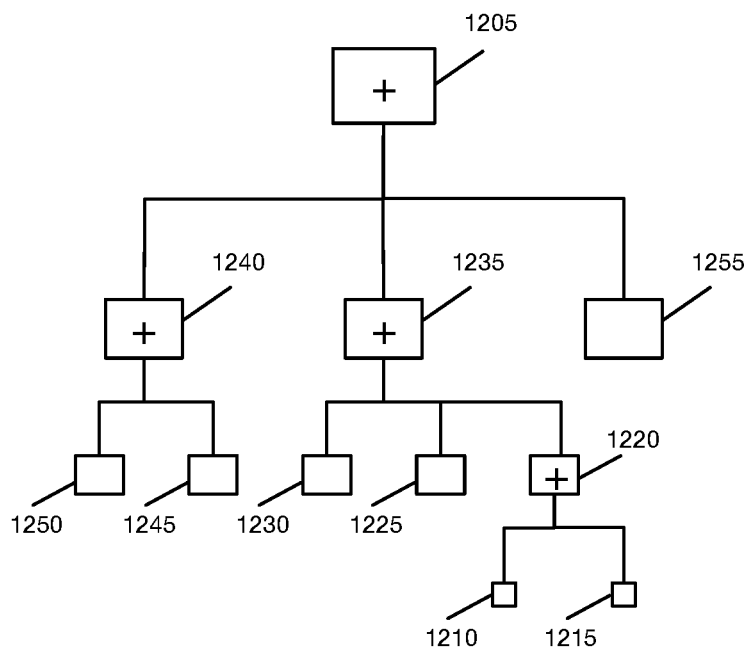
FIG. 12 conceptually illustrates a hash tree of some embodiments corresponding to the JSON document of FIG. 11.

The corresponding hash tree 1205 for the JSON document 1105 of FIG. 11 is illustrated in FIG. 12. First, the hashes 1210 and 1215 are computed from nodes 1150 and 1155, respectively. These hashes are then combined, for example by concatenation in some embodiments. The combined hashes are then hashed again to obtain hash 1220 corresponding to branch 1145. A plus sign ("+") represents the combination of hashes used to calculate hash 1220.

Similarly, hash values 1225 and 1230 are also calculated corresponding to nodes 1135 and 1140. Hash values 1220-1230 are then combined, in the same manner as the previous hashes. The hash value 1235 of the combined hashes 1220-1230 is then calculated to obtain the hash value for the entire branch 1115. Likewise, the hash value 1240 for the branch 1110 is calculated from hashes 1245 and 1250 of nodes 1125 and 1130. The combination of hashes is represented by a plus sign ("+") for hashes 1240 and 1235. However, since node 1120 has no child nodes of its own, its corresponding hash value 1255 is calculated directly without any combination of hash values.

Combining hash values 1235, 1240, and 1255 corresponding to branches 1115, 1110, and 1120, the hash 1205 is computed. The resulting hash 1205 corresponds to the hash of the entire JSON document 1105. The combination of hashes 1240, 1235, and 1255 is represented by a plus sign ("+") at hash value 1205. The hash value 1205 is a different hash value than what would be obtained if the entire JSON document 1105 were hashed as unstructured binary data. If any branch of the JSON document 1105 is missing, the complete hash 1205 may still be calculated if the hash value for the missing branch is available. The hash value of the missing branch is simply substituted in and combined with the other hashes as before.

Figure 13:
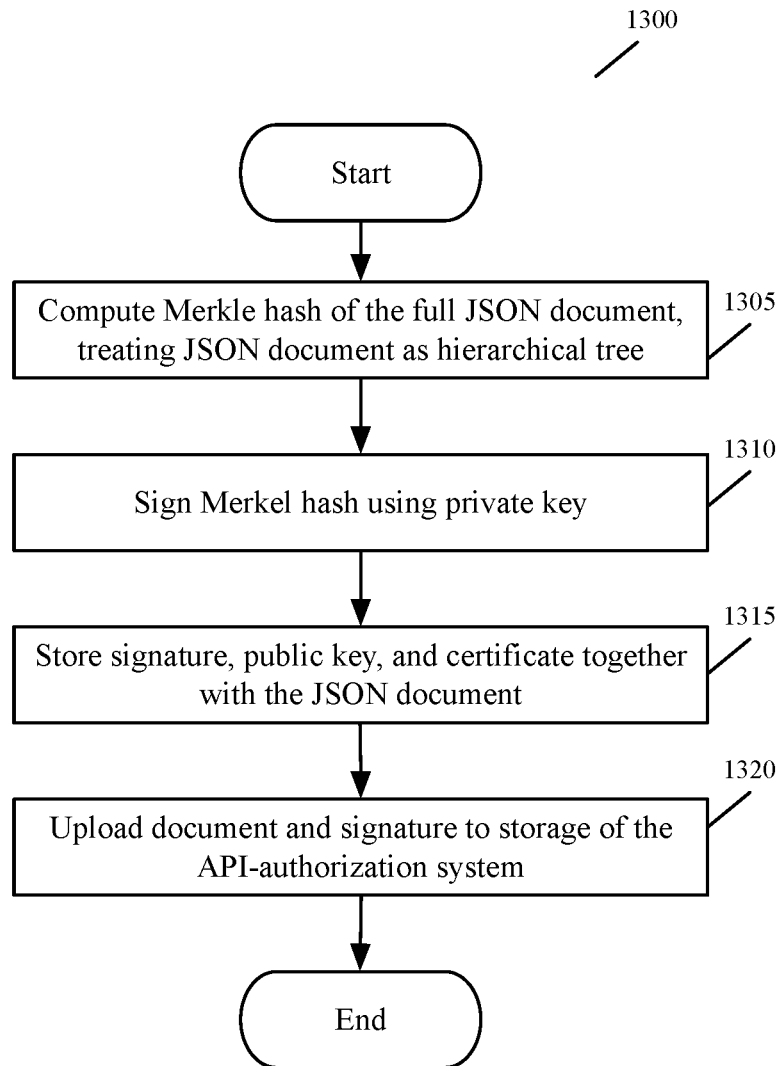
FIG. 13 conceptually illustrates a process of the API-authorization system for signing a JSON document in some embodiments.

FIG. 13 illustrates a process 1300 of the API-authorization system for signing a JSON document in some embodiments. The process will be explained with reference to the sample JSON document in FIG. 11 and corresponding hash tree in FIG. 12.

The signing process 1300 executes at a data source agent of the entity. In some embodiments the data source is located on-premises. The process first computes (at 1305) the hash 1205 of the full JSON document 1105 representing the most recent contextual data downloaded from the entity's system. This hash 1205 is computed over the JSON document 1105, with the JSON document being treated as a hierarchical tree. For example, in some embodiments the hash is computed as a Merkle tree. As a result, intermediate hash values are produced for each branch of the JSON document 1105. A single hash 1205 is still produced for the entire document using these intermediate hash values. The resulting hash value 1205 differs from the ordinary hash that would be produced by computation over the serialized byte presentation of the JSON document 1105 without reference to the document structure.

When contextual data in the documents changes, all the hashes must be recomputed for storage in the filter tree in some embodiments. The updated document corresponds to the original document, i.e. has the same elements arranged in the same hierarchical structure to represent parent and child relationships between the elements. However, one or more elements may be modified, e.g. parameters for evaluating API requests may be modified. In addition, some elements may be added, and some elements may be removed. Many elements will remain identical, unchanged. After computing the new hash over the document, the new hash is then signed as before, and the branch hashes are saved to the filter tree.

The signing process 1300 of the API-authorization system then signs (at 1310) the hash 1205 with a private signing key, per typical public key cryptographic best practices. The process then locally stores (at 1315) the resulting signature, and the corresponding public key (and its certificate), with the JSON document 1105. However, in some embodiments, the signing process does not store any hashes nor their intermediates. Since the signing process executes on machines under the entity's control, the private signing key is never exposed to the API-authorization system.

The signing process 1300 then uploads (at 1320) the JSON document 1105 along with its signature to the server-side modules 1010 of the API-authorization system, which stores the uploaded JSON document 1105 in the Policy & Content Document Database 1035. In some embodiments, the public key may also be uploaded. The process then ends.

Figure 14:
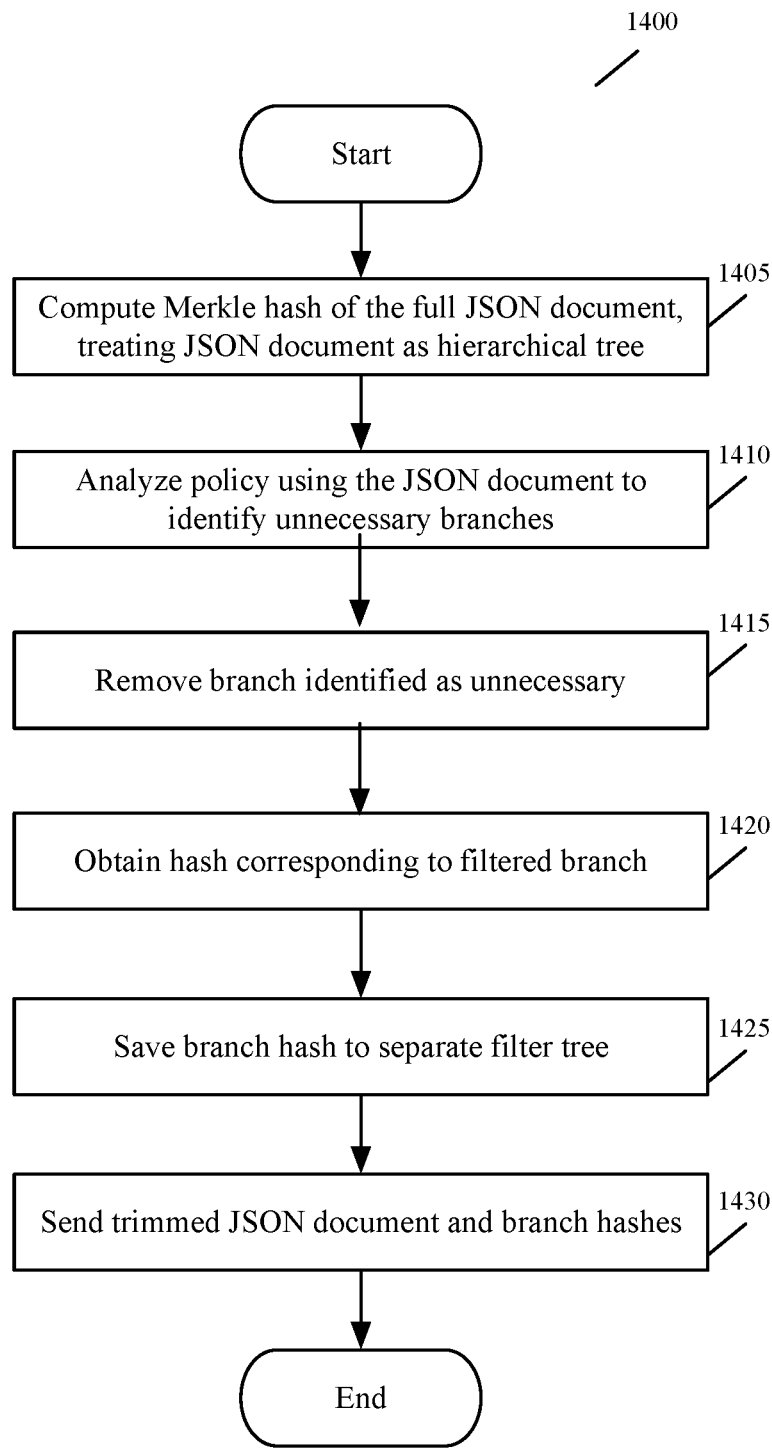
FIG. 14 conceptually illustrates a filtering process of the API authorization system of some embodiments.

When the server-side modules 1010 of the API-authorization send contextual data to the entity's policy enforcement agents, the API-authorization system service filters unnecessary contextual data out of the JSON document 1105. In some embodiments, the unnecessary contextual data for a policy enforcing agent include (1) data previously provided to the enforcing agent that has not changed, and (2) data not needed by the enforcing agent. FIG. 14 illustrates a filtering process 1400 of the API-authorization system for filtering the contextual data before sending the JSON document to the entity's policy enforcement agents. The process will be explained with reference to the sample JSON document in FIG. 11 and corresponding hash tree in FIG. 12. In some embodiments the filtering process 1400 is performed by the remote policy server set 105.

The filtering process 1400 recomputes (at 1405) the hash tree 1205-1255, using the whole JSON document as earlier received by the signing process 1300 in step 1320. In some embodiments, the filtering process 1400 computes the necessary hashes on the fly per document served (when policy bundles are being downloaded), or in other embodiments computes them once and saves/caches them with the document. If saved, the system reduces the storage cost by using delta-encoding over time in some embodiments. That is, if content remains stable over time, the hashes remain stable as well.

The filtering process 1400 then evaluates (at 1410) each branch of the JSON document to determine what branches contain unnecessary data. Some embodiments identify unnecessary data with static code analysis that is guaranteed not to change the evaluation result in any condition. In other embodiments, the unnecessary data is data that has not changed from a previous iteration. The static code analysis need not be an optimal reduction, as the data can still include unused portions. The base algorithm is simply, if the data is not referred to in the code, it is not needed. For example, if the code only has data references to nodes 1135, 1140, and 1120, the downloaded JSON document would not need branches 1110 or 1145.

Furthermore, in some embodiments the system can also filter unnecessary values of required data, even when there is a reference to the data. For example, if the policy has a statement "A=50", only the value of 50 is required and all other possible values for the variable A can be removed. However, data cannot be filtered effectively if it is used in negation. If the condition is "A not=50", then the system only removes the content where A=50, and all other values of A are included.

When a branch of the JSON document is to be filtered entirely, the system removes (at 1415) the identified branch. For example, if the evaluation in step 1410 determines that nodes 1125 and 1130 are not required, then the entire branch 1110 can be filtered. If the evaluation determines that node 1150 is not required, then the filtering process 1400 must still retain nodes 1145 and 1115.

At step 1420, the filtering process obtains the hash values from the complete hash tree computed in step 1405 that correspond to the branches that were removed. In some embodiments, the filtering process stores these branch hashes in a separate filter tree (not shown) in step 1425. In the example above, hashes 1240-1250 are saved, since the entire branch 1110 was trimmed after determining that nodes 1125 and 1130 were not necessary.

The filtering process 1400 then sends (at 1430) the trimmed JSON document 1105 to the policy enforcement agent (e.g. the local agent 220) or to the controller, as well as sending the separate filter tree of branch hashes, and the signature of the JSON document uploaded by the signing process 1300 at step 1320. Aside from the corresponding hashes saved in the separate tree, in some embodiments no further details of the content that is cut are included in the trimmed document. In some embodiments, the filter tree and signature are included in a signature envelope, and a separate signature envelope is included for each data source, since each data source is signed individually. Accordingly, the filtering process 1400 sends at step 1430 a bundle of signature envelopes with the trimmed JSON document and filter tree. The process then ends.

Figure 15:
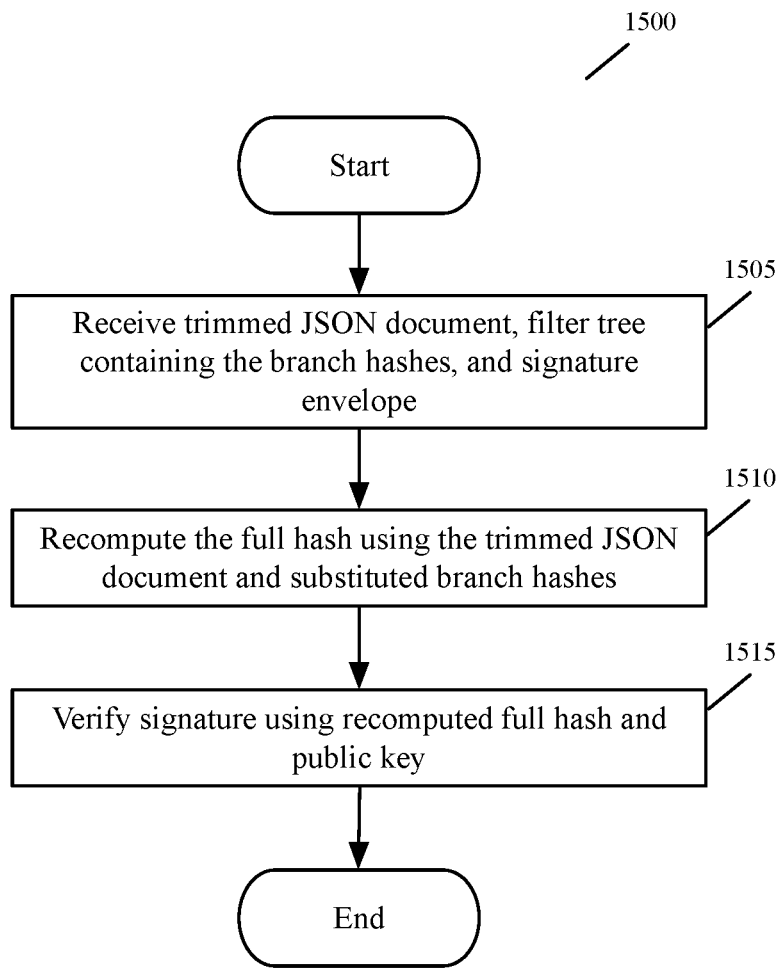
FIG. 15 conceptually illustrates a process of the API authorization system for verifying signatures from a single data source JSON document in some embodiments.

On the enforcement side, either at a controller or a policy agent (e.g. local policy agent 220), the system performs a verification process, illustrated in FIG. 15 as process 1500, to verify the signatures for a single data source JSON document. In other embodiments, the verification process 1500 is performed by an enforcement agent on the entity's own systems on-premise. The process will be explained with reference to the sample JSON document in FIG. 11 and corresponding hash tree in FIG. 12.

First, the verification process 1500 receives (at 1505) the trimmed JSON document, the document signature envelope, and the filter tree of branch hashes (e.g. 1240-1250) from the server-side modules 1010. The process does not receive the full JSON document 1105 or the complete hash value 1205. In some embodiments, each data source has its own signature envelope, since each data source is signed individually and from different data source agent instances. Accordingly, a single downloaded 'bundle' from the API-authorization system service may contain multiple signatures, for both contextual data and policies.

In some embodiments the public key is included in a certificate attached with the signature envelope. The certificate is considered trusted by the policy agent, with precondition that the public key has been explicitly listed as trusted (through configuration) or a certificate chain explicitly listed as trusted. The trust chain establishment process follows standard PKI best practices.

At step 1510, the verification process 1500 recomputes the complete hash tree 1205-1255 from the trimmed JSON document and the filter tree. In some embodiments, this step 1510 of the process 1500 is performed by a signature validator component of the policy agent or controller. The verification process computes the tree in the same manner as described above with reference to FIG. 11 and FIG. 12. Where a branch was trimmed, the verification process uses the corresponding hash of the branch saved during the filtering at step 1425 in the filtering process 1400. The verification process substitutes the equivalent branch hash from the filter tree wherever data has been trimmed from the JSON document. Therefore, the complete hash can still be calculated even though data has been trimmed. This process can be repeated recursively for sub-branches, sub-branches of sub-branches, and so on, as long as the hash for each branch or sub-branch was computed and available in the filter tree.

The verification process 1500 then verifies the signature (at 1515) by using the recomputed full hash and the public key. Specifically, the verification process 1500 first verifies that the public key is valid using the certificate. Then, the verification process 1500 computes the signature of the recomputed hash using the public key and compares it to the downloaded signature. If the downloaded signature matches the signature calculated using the public key, then the contextual data is verified as authentic in originating from the entity.

Figure 16:
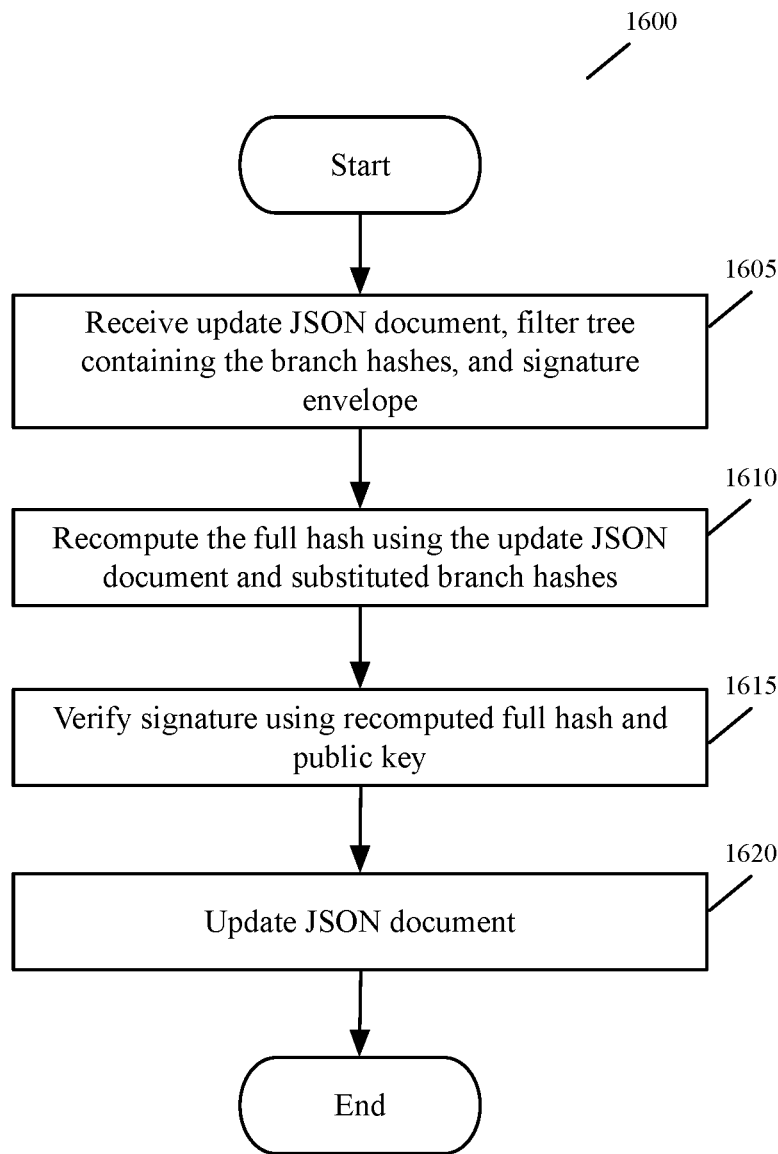
FIG. 16 conceptually illustrates an update verification process for an updated JSON document.

In some embodiments, the contextual data is updated at the data source and distributed to the local agents for updating their local copies that were previously validated using the verification process 1500. The updates are distributed in the same format as the original JSON documents in some embodiments. The update must also be validated as originating from the entity, before they can be applied to update the previously validated JSON document. This prevents unauthorized sources from distributing parameters to evaluate API requests, which is a security risk. The update verification process 1600 for an update JSON document is conceptually illustrated in FIG. 16, which is performed in some embodiments by the local agent 220. In other embodiments, the update verification process 1600 is performed by an enforcement agent on the entity's own systems on-premise.

First, the update verification process 1600 receives at step 1605 the update JSON document and corresponding document signature envelope. The update JSON document corresponds to the trimmed JSON document originally received in step 1505 of the verification process 1500 (hereafter referred to as the original JSON document for brevity). However, some of the elements in the update document have values that are modified relative to the original document. In addition, in some embodiments there may be new elements added and other elements removed in the update document relative to the original document.

The update verification process 1600 also receives an update filter tree of hashes corresponding to the filtered branches of the original trimmed JSON document received previously. The filter tree will contain additional hashes for branches removed in the update document, and will not contain hashes for branches that were modified or added in the update document. In some embodiments the update filter tree will not contain hashes for elements of the original JSON document that were not modified in the update JSON document, as the previous hashes for unchanged branches can be re-used from the verification process 1500.

At step 1610, the update verification process 1600 recomputes a complete hash tree using the update JSON document and the update filter tree. In some embodiments, this step 1610 of the process 1600 is performed by a signature validator component of the policy agent or controller. The verification process computes the tree in the same manner as described above with reference to FIG. 11 and FIG. 12. Where a branch was trimmed, the update verification process substitutes the equivalent branch hash from the update filter tree and/or the previously received filter tree. This process can be repeated recursively for sub-branches, sub-branches of sub-branches, and so on, as long as the hash for each branch or sub-branch was computed and available in the update filter tree and/or the previously received filter tree.

The update verification process 1600 then verifies the signature (at 1615) by using the recomputed full hash of the update JSON document and the public key. The update verification process 1600 computes the signature of the recomputed hash using the public key and compares it to the downloaded signature. If the downloaded signature matches the signature calculated using the public key, then the contextual data in the update JSON document has been verified as authentic.

Once the update JSON document is verified as authentic, the update verification process 1600 then revises (at 1620) the previously received (at 1505) JSON document. Based on the elements of the update JSON document, new elements are added, some elements are removed, and the values of some elements are modified. After updating the JSON document, the update verification process 1600 ends. Further updates to the JSON document are processed and validated using the verification process 1600 in the same manner, with the previously-updated JSON document as the original for a new update JSON document.

The API-authorization system has the following properties for signing contextual data which allows this data to be filtered. First, there is no extra storage cost beyond one signature and its public key. The computed hash tree does not have to be transferred with the signature. Second, the data signing takes roughly the same time as with standard signatures: it is one public key operation used to sign a computed hash (tree). Third, the verification is the same cost as well, i.e., hashing and one public key operation. Fourth, filtering remains as effective as before with the exception of the negation scenario which may now require preserving the negated content.

For policies, the signatures are handled in some embodiments like ordinary digital signatures. Namely, a hash of policy document (source) is computed which is then signed and can be equally verified by recomputing the hash. No trimming for policies is executed so the signatures remain valid.

On the enforcement side, when the policies are loaded from API-authorization system and then verified, the overall process starts from the policy that is to be executed and therefore triggered the downloading. That is, if the evaluation calls for running policy a/b/c, the policy for that name is verified first. Then what follows is static analysis of that policy and then loading and further verification of any referred data and policies. This proceeds recursively until all the policies and data have been loaded and verified.

However, it could be that all the policies and data referred do not exist, or that they are referred in a way it's not clear how many they are. For instance, consider the following scenario. If the data reference is an aggregate, say, a.b, while the individual data sources with signatures are a.b.c and a.b.d, there is no provable way to conclude, using only the reference a.b, which are the data sources to expect. Therefore, while still not being able to tamper with the contents, it is possible for an attacker to cause omission of those data source contents from the downloaded bundle. The verifier would have no way of separating between the cases of data not originally even existing and attacker removing the data on the path. The above applies also to policies.

There are several options for how to solve this inability to figure out the existence of data sources and policies. First, the entity can provide a signed, trusted list of data sources/policies in its managed namespace. Then using that signed catalog, it is easy for the verifier to validate whether the entity got all the data sources and policies that should exist. The second option is to include enough metadata in the policies itself (holding these references). They could indicate which are the expected and required data sources and policies—or simply require that anything referred has to exist as such. Then at the verification time, the verifier could compare the required and available names.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
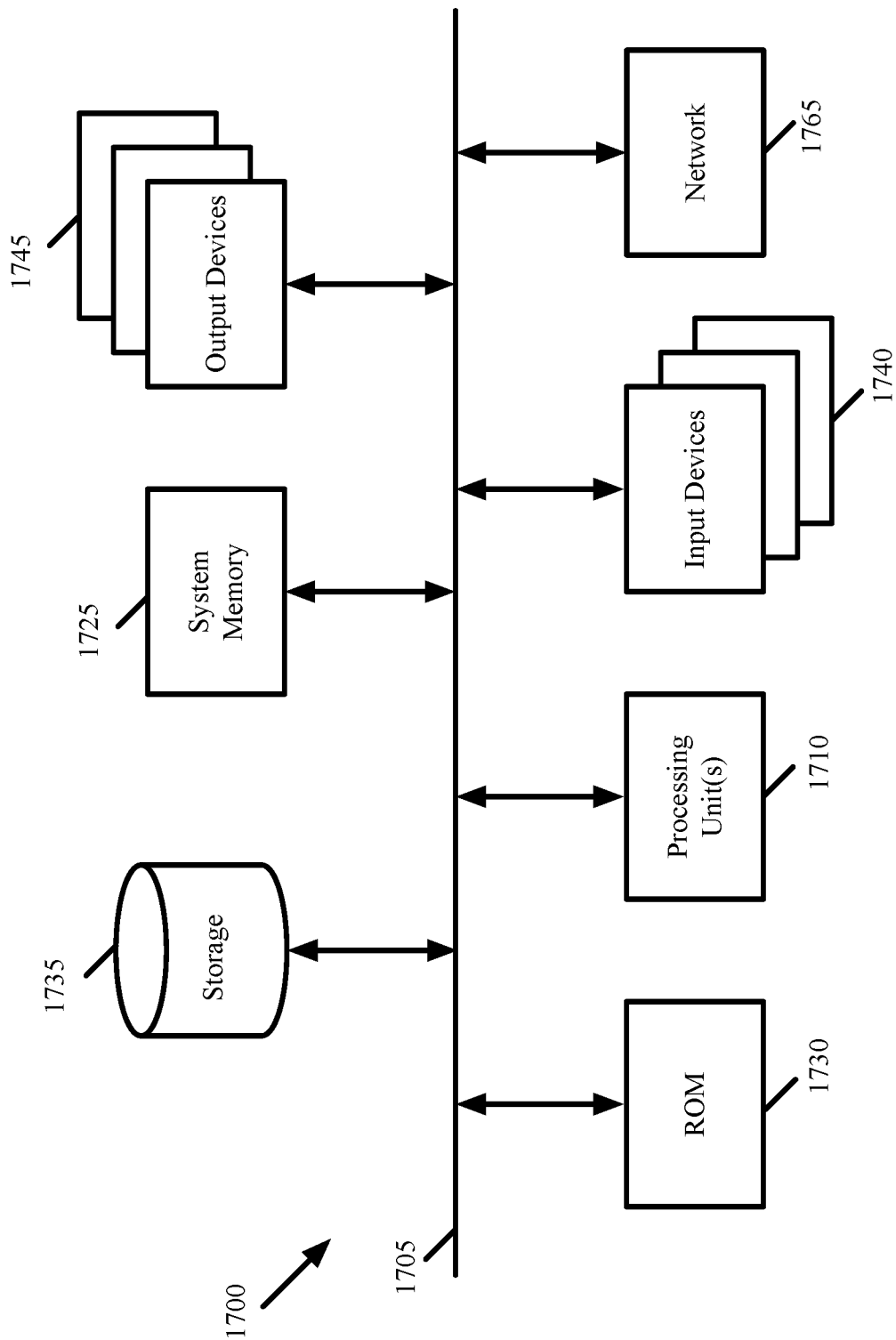
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer (e.g., a desktop computer, personal computer, tablet computer, server computer, mainframe, a blade computer etc.), phone, PDA, or any other sort of electronic device. The electronic system 1700 is also the control plane modules of the load balancer of some embodiments. As shown, the electronic system includes various types of computer readable media and interfaces for various other types of computer readable media. Specifically, the electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory (ROM) 1730, the system memory 1725, and the permanent storage device 1735. From these various memory units, the processing unit(s) 1710 retrieve instructions to execute and data to process in order to execute the processes of the invention. The processing unit(s) may be a single processor or a multi-core processor in different embodiments.

The ROM 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

While micro-services were mentioned as one type of applications that could get the benefit of the API-authorization processes and systems of some embodiments, one of ordinary skill will realize that these processes and systems of some embodiments are also used to authorize API calls for other types of applications, such as SSH (secure shell) applications or other types of applications. Also, in several embodiments described above, the API-authorization enforcement system enforces API-authorization policies for different sets of related machines in one or more datacenters. In other embodiments, the API-authorization enforcement system enforces API-authorization policies just based on the applications or types of applications executing on the computers. For instance, a datacenter can employ the API-authorization enforcement system of some embodiments for one or more application or application types of all of its tenants or users. In these embodiments, the policies are policies that are deployed based on application identity or type, and not based on association between related sets of machines executing in the datacenter.

Also, several of the above-described embodiments have the local agents and/or the server set evaluate the policies based on the operands to determine whether to allow or reject API calls. In other embodiments, the local agents or the server set configure the applications 115 that receive the API calls, or other agents/processes in the datacenter authorize or reject API calls based on configurations that the local agents and/or server set push to these applications and/or other agents/processes. For instance, each time a local namespace portion is updated, the local agent or the server set in an AWS datacenter identifies the API calls affected by the update, determines whether these API calls should now be allowed or rejected, and pushes to the AWS IAM (Identity and Access Management) system new configuration data to ensure that these API calls are appropriately allowed or rejected.

In some embodiments, some or all of the local agent functionality is embedded in a plugin that is installed in the API-processing application. In this manner, some or all of the above-described operations of the local agents are performed by plugins installed in the API-processing applications in some embodiments. In other embodiments, instead of implementing these operations with plugins, some embodiments have the local agent and/or server set update API rule configuration file of an API-processing application whenever the local namespace associated with the application is modified and this modification affects the application's processing of one or more API calls. Therefore, one of ordinary skill in the art would understand that the invention is not to be limited by the foregoing illustrative details, but rather is to be defined by the appended claims.

We claim:

1. A method for validating an update to a hierarchical document used for authorizing Application Programming Interface (API) calls to an application, the hierarchical document comprising a plurality of elements including a set of policies and a plurality of parameters, the method comprising:
receiving an update comprising a first set of elements for updating the hierarchical document;
receiving a first set of hash values for a second set of elements in the hierarchical document not in the received update;
generating a second set of hash values from the first set of elements that are for updating the hierarchical document;
generating an overall hash by using the received first set of hash values and the generated second set of hash values; and
using the overall hash to validate the update to the hierarchical document.

2. The method of claim 1, wherein the first set of elements comprise a first set of parameters to replace a second set of parameters of the hierarchical document.

3. The method of claim 2, wherein using the overall hash comprises using a signature from an entity that is authorized to specify parameters for the hierarchical document to validate the update to the hierarchical document.

4. The method of claim 1 further comprising:
generating a signature for the overall hash;
comparing the generated signature with the signature from the authorized entity to determine whether the two signatures match; and
when the signatures match, specifying that the update to the hierarchical document has been validated as originating from the authorized entity.

5. The method of claim 1 further comprising updating the stored hierarchical document using the validated update.

6. The method of claim 5, wherein updating the stored hierarchical document comprises replacing a third set of elements of the stored hierarchical document with the first set of elements of the update.

7. The method of claim 5, wherein updating the stored hierarchical document comprises removing elements from the stored hierarchical document absent in the first set of elements.

8. The method of claim 5, wherein updating the stored hierarchical document comprises adding, to the stored hierarchical document, at least one element in the first set of elements.

9. The method of claim 1, wherein the update is received as a hierarchical document that corresponds to the stored hierarchical document.

10. The method of claim 1, wherein the update and the stored hierarchical document are each in JavaScript Object Notation (JSON) format.

11. A non-transitory machine readable medium storing a program which when executed by at least one processing unit validates an update to a hierarchical document used for authorizing Application Programming Interface (API) calls to an application, the hierarchical document comprising a plurality of elements including a set of policies and a plurality of parameters, the program comprising sets of instructions for:

receiving an update comprising a first set of elements for updating the hierarchical document;

receiving a first set of hash values for a second set of elements in the hierarchical document not in the received update;

generating a second set of hash values from the first set of elements that are for updating the hierarchical document;

generating an overall hash by using the received first set of hash values and the generated second set of hash values; and using the overall hash to validate the update to the hierarchical document.

12. The non-transitory machine readable medium of claim 11, wherein the first set of elements comprise a first set of parameters to replace a second set of parameters of the hierarchical document.

13. The non-transitory machine readable medium of claim 12, wherein the set of instructions for using the overall hash comprises a set of instructions for using a signature from an entity that is authorized to specify parameters for the hierarchical document to validate the update to the hierarchical document.

14. The non-transitory machine readable medium of claim 11, wherein the program further comprises sets of instructions for:

generating a signature for the overall hash;

comparing the generated signature with the signature from the authorized entity to determine whether the two signatures match; and when the signatures match, specifying that the update to the hierarchical document has been validated as originating from the authorized entity.

15. The non-transitory machine readable medium of claim 11, wherein the program further comprises a set of instructions for updating the stored hierarchical document using the validated update.

16. The non-transitory machine readable medium of claim 15, wherein the set of instructions for updating the stored hierarchical document comprises a set of instructions for replacing a third set of elements of the stored hierarchical document with the first set of elements of the update.

17. The non-transitory machine readable medium of claim 15, wherein the set of instructions for updating the stored hierarchical document comprises a set of instructions for removing elements from the stored hierarchical document absent in the first set of elements.

18. The non-transitory machine readable medium of claim 15, wherein the set of instructions for updating the stored hierarchical document comprises a set of instructions for adding, to the stored hierarchical document, at least one element in the first set of elements.

19. The non-transitory machine readable medium of claim 11, wherein the update is received as a hierarchical document that corresponds to the stored hierarchical document.

20. The non-transitory machine readable medium of claim 11, wherein the update and the stored hierarchical document are each in JavaScript Object Notation (JSON) format.

\* \* \* \* \*